US007038690B2

(12) United States Patent
Wilt et al.

(10) Patent No.: US 7,038,690 B2
(45) Date of Patent: May 2, 2006

(54) METHODS AND SYSTEMS FOR DISPLAYING ANIMATED GRAPHICS ON A COMPUTING DEVICE

(75) Inventors: Nicholas P. Wilt, Sammamish, WA (US); Colin D. McCartney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 10/074,286

(22) Filed: Feb. 12, 2002

(65) Prior Publication Data

US 2003/0071818 A1 Apr. 17, 2003

Related U.S. Application Data

(60) Provisional application No. 60/278,216, filed on Mar. 23, 2001.

(51) Int. Cl.
*G06F 13/00* (2006.01)

(52) U.S. Cl. ....................... 345/537; 345/535; 345/539; 345/503; 345/629

(58) Field of Classification Search ................. 345/503, 345/505, 520, 531, 535, 536, 537, 539, 629, 345/632, 660, 672, 501
See application file for complete search history.

(56) References Cited

U.S. PATENT DOCUMENTS 5,583,536 A 12/1996 Cahill, III
5,748,866 A 5/1998 Edgar
5,801,717 A 9/1998 Engstrom et al.
5,844,569 A * 12/1998 Eisler et al. ................ 345/619
5,850,232 A * 12/1998 Engstrom et al. ........... 345/539
6,040,861 A 3/2000 Boroczky et al.
6,262,776 B1 7/2001 Griffits
6,359,631 B1 * 3/2002 DeLeeuw ................... 345/629
6,377,257 B1 4/2002 Borrel et al.
6,384,821 B1 5/2002 Borrel et al.

(Continued)

OTHER PUBLICATIONS

B. Wei, D. Clark, E. Felten, and K. Li. Performance Issues of a Distributed Frame Buffer on a Multicomputer. In Proceeding of the ACM SIGGRAPH/EUROGRAPHICS workshop on Graphics Hardware, pp. 87–96, Aug. 1998.*

(Continued)

*Primary Examiner*—Kee M. Tung
(74) *Attorney, Agent, or Firm*—Merchant & Gould

(57) ABSTRACT

Disclosed are methods and systems for interfaces between video applications and display screens that allow applications to intelligently use display resources of their host device without tying themselves too closely to operational particulars of that host. A graphics arbiter provides display environment information to the video applications and accesses the applications' output to efficiently present that output to the display screen, possibly transforming the output or allowing another application to transform it in the process. The graphics arbiter tells applications the estimated time when the next frame will be displayed on the screen. Applications tailor their output to the estimated display time, thus improving output quality while decreasing resource waste by avoiding the production of "extra" frames. The graphics arbiter tells an application when its output is fully or partially occluded so that the application need not expend resources to draw portions of frames that are not visible.

12 Claims, 18 Drawing Sheets

U.S. PATENT DOCUMENTS

| | | | | | |
|---|---|---|---|---|---|
| 6,473,086 | B1 | * | 10/2002 | Morein et al. | 345/505 |
| 6,476,806 | B1 | | 11/2002 | Cunniff et al. | |
| 6,549,948 | B1 | | 4/2003 | Sasaki et al. | |
| 6,628,297 | B1 | | 9/2003 | Wraae et al. | |
| 6,664,968 | B1 | * | 12/2003 | Ono | 345/532 |
| 6,753,878 | B1 | * | 6/2004 | Heirich et al. | 345/629 |
| 6,760,048 | B1 | | 7/2004 | Bates et al. | |
| 2001/0008577 | A1 | | 7/2001 | Yamada et al. | |
| 2002/0126987 | A1 | | 9/2002 | Kamiya | |
| 2003/0071818 | A1 | | 4/2003 | Wilt et al. | |
| 2004/0130558 | A1 | * | 7/2004 | MacInnis et al. | 345/629 |

OTHER PUBLICATIONS

S. Nishimura and T. Kunii. VC–1: A Scalable Graphics Computer with Virtual Local Frame Buffers. In Proceedings of the 23rd Annual Conference on Computer Graphics and Interactive Techniques, pp. 365–373, Aug. 1996.*
U.S. Final Official Action dated Sep. 9, 2005 cited in Application No. 10/077,568.

* cited by examiner

METHODS AND SYSTEMS FOR DISPLAYING ANIMATED GRAPHICS ON A COMPUTING DEVICE

CROSS-REFERENCE TO RELATED APPLICATIONS

The present application claims the benefit of U.S. Provisional Patent Application 60/278,216, filed on Mar. 23, 2001, which is hereby incorporated in its entirety by reference. The present application is also related to two other patent applications claiming the benefit of that same provisional application: "Methods and Systems for Preparing Graphics for Display on a Computing Device", U.S. patent application Ser. No. 10/074,201, filed on Feb. 12, 2002, and "Methods and Systems for Merging Graphics for Display on a Computing Device", U.S. patent application Ser. No. 10/077,568, filed on Feb. 15, 2002.

TECHNICAL FIELD

The present invention relates generally to displaying animated visual information on the screen of a display device, and, more particularly, to efficiently using display resources provided by a computing device.

BACKGROUND OF THE INVENTION

In all aspects of computing, the level of sophistication in displaying information is rising quickly. Information once delivered as simple text is now presented in visually pleasing graphics. Where once still images sufficed, full motion video, computer-generated or recorded from life, proliferates. As more sources of video information become available, developers are enticed by opportunities for merging multiple video streams. (Note that in the present application, "video" encompasses both moving and static graphics information.) A single display screen may concurrently present the output of several video sources, and those outputs may interact with each other, as when a running text banner overlays a film clip.

Presenting this wealth of visual information, however, comes at a high cost in the consumption of computing resources, a problem exacerbated both by the multiplying number of video sources and by the number of distinct display presentation formats. A video source usually produces video by drawing still frames and presenting them to its host device to be displayed in rapid succession. The computing resources required by some applications, such as an interactive game, to produce just one frame may be significant, the resources required to produce sixty or more such frames every second can be staggering. When multiple video sources are running on the same host device, resource demand is heightened not only because each video source must be given its appropriate share of the resources, but because even more resources may be required by applications or by the host's operating, system to smoothly merge the outputs of the sources. In addition, video sources may use different display formats, and the host may have to convert display information into a format compatible with the host's display.

Traditional ways of approaching the problem of expanding demand for display resources fall along a broad spectrum from carefully optimizing the video source to its host's environment to almost totally ignoring the specifics of the host. Some video sources carefully shepherd their use of resources by being optimized for a specific video task. These sources include, for example, interactive games and fixed function hardware devices such as digital versatile disk (DVD) players. Custom hardware often allows a video source to deliver its frames at the optimum time and rate as specified by the host device. Pipelined buffering of future display frames is one example of how this is carried out. Unfortunately, optimization leads to limitations in the specific types of display information that a source can provide: in general, a hardware-optimized DVD player can only produce MPEG2 video based on information read from a DVD. Considering these video sources from the inside, optimization prevents them from flexibly incorporating into their output streams display information from another source, such as a digital camera or an Internet streaming content site. Considering the optimized video sources from the outside, their specific requirements prevent their output from being easily incorporated by another application into a unified display.

At the other end of the optimization spectrum, many applications produce their video output more or less in complete ignorance of the features and limitations of their host device. Traditionally, these applications trust the quality of their output to the assumption that their host will provide "low latency," that is, that the host will deliver their frames to the display screen within a short time after the frames are received from the application. While low latency can usually be provided by a lightly loaded graphics system, systems struggle as video applications multiply and as demands for intensive display processing increase. In such circumstances, these applications can be horribly wasteful of their host's resources. For example, a given display screen presents frames at a fixed rate (called the "refresh rate"), but these applications are often ignorant of the refresh rate of their host's screen, and so they tend to produce more frames than are necessary. These "extra" frames are never presented to the host's display screen although their production consumes valuable resources. Some applications try to accommodate themselves to the specifics of their host-provided environment by incorporating a timer that roughly tracks the host display's refresh rate. With this, the application tries to produce no extra frames, only drawing one frame each time the timer fires. This approach is not perfect, however, because it is difficult or impossible to synchronize the timer with the actual display refresh rate. Furthermore, timers cannot account for drift if a display refresh takes slightly more or less time than anticipated. Regardless of its cause, a timer imperfection can lead to the production of an extra frame or, worse, a "skipped" frame when a frame has not been fully composed by the time for its display.

As another wasteful consequence of an application's ignorance of its environment, an application may continue to produce frames even though its output is completely occluded on the host's display screen by the output of other applications. Just like the "extra" frames described above, these occluded frames are never seen but consume valuable resources in their production.

What is needed is a way to allow applications to intelligently use display resources of their host device without tying themselves too closely to operational particulars of that host.

SUMMARY OF THE INVENTION

The above problems and shortcomings, and others, are addressed by the present invention, which can be understood by referring to the specification, drawings, and claims. According to one aspect of the invention, a graphics arbiter acts as an interface between video sources and a display component of a computing system. (A video source is anything that produces graphics information including, for example, an operating system and a user application.) The graphics arbiter (1) collects information about the display environment and passes that information along to the video sources and (2) accesses the output produced by the sources to efficiently present that output to the display screen component, possibly transforming the output or allowing another application to transform it in the process.

The graphics arbiter provides information about the current display environment so that applications can intelligently use display resources. For example, using its close relationship to the display hardware, the graphics arbiter tells applications the estimated time when the display will "refresh," that is, when the next frame will be displayed. Applications tailor their output to the estimated display time, thus improving output quality while decreasing resource waste by avoiding the production of "extra" frames. The graphics arbiter also tells applications the time when a frame was actually displayed. Applications use this information to see whether they are producing frames quickly enough and, if not, may choose to degrade video quality in order to keep up. An application may cooperate with the graphics arbiter to control the application's resource use by directly setting the application's frame production rate. The application blocks its operations until a new frame is called for, the graphics arbiter unblocks the application while it produces the frame, and then the application blocks itself again. Because of its relationship to the host's operating system, the graphics arbiter knows the layout of everything on the display screen. It tells an application when its output is fully or partially occluded so that the application need not expend resources to draw portions of frames that are not visible. By using graphics arbiter-provided display environment information, an application's display output can be optimized to work in a variety of display environments.

The graphics arbiter can itself use display environment information to conserve display resources. The graphics arbiter introduces a level of persistence into the display buffers used to prepare frames for the screen. The arbiter need only update those portions of the display buffers that have changed from the previous frame.

Because the graphics arbiter has access to the output buffers of the applications, it can readily perform transformations on the applications' output before sending the output to the display hardware. For example, the graphics arbiter converts from a display format favored by an application to a format acceptable to the display screen. Output may be "stretched" to match the characteristics of a display screen different from the screen for which the application was designed. Similarly, an application can access and transform the output of other applications before the output is displayed on the host's screen. Three dimensional renderings, lighting effects, and per-pixel alpha blends of multiple video streams are some examples of transformations that may be applied. Because transformations can be performed transparently to the applications, this technique allows flexibility while at the same time allowing the applications to optimize their output to the specifics of a host's display environment.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1*a* shows the simplest arrangement wherein a display source writes into a presentation buffer which is, in turn, read by a display device; FIGS. 1*b* and 1*c* illustrate how a "flipping chain" of buffers associated with the display device decouples the writing by the display source from the reading by the display device; FIG. 1*d* shows that the display source may have its own internal flipping chain; FIG. 1*e* makes the point that there may be several display sources concurrently writing into the flipping chain associated with the display device;

DETAILED DESCRIPTION OF THE INVENTION

Figure 1A:
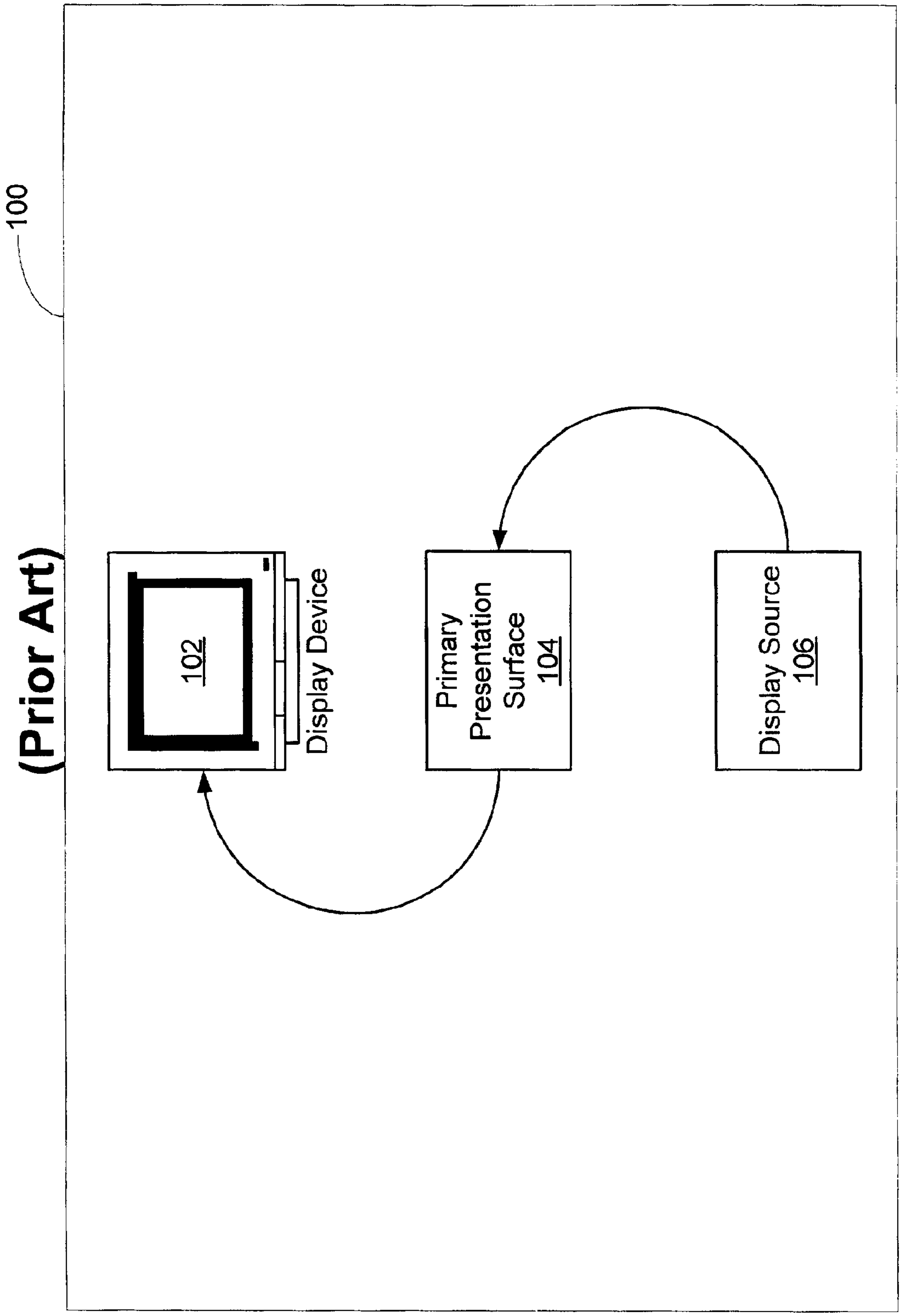
FIG. 1a (Prior Art)
FIGS. 1*a* through 1*e* are block diagrams illustrating the operation of memory buffers in typical prior art displays.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein. Section I presents background information on how video frames are typically produced by applications and then presented to display screens. Section II presents an exemplary computing environment in which the invention may run. Section III describes an intelligent interface (a graphics arbiter) operating between the display sources and the display device. Section IV presents an expanded discussion of a few features enabled by the intelligent interface approach. Section V describes the augmented primary surface. Section VI presents an exemplary interface to the graphics arbiter.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

I. Producing and Displaying Video Frames

Before proceeding to describe aspects of the present invention, it is useful to review a few basic video display concepts. FIG. 1*a* presents a very simple display system running on a computing device 100. The display device 102 presents to a user's eyes a rapid succession of individual still frames. The rate at which these frames are presented is called the display's "refresh rate." Typical refresh rates are 60 Hz and 72 Hz. When each frame differs slightly from the one before it, the succession of frames creates an illusion of motion. Typically, what is seen on the display device is controlled by image data stored within a video memory buffer, illustrated in the Figure by a primary presentation surface 104 that contains a digital representation of a frame to display. Periodically, at the refresh rate, the display device reads a frame from this buffer. More specifically, when the display device is an analog monitor, a hardware driver reads the digital display representation from the primary presentation surface and translates it into an analog signal that drives the display. Other display devices accept a digital signal directly from the primary presentation surface without translation.

At the same time that the display device 102 is reading a frame from the primary presentation surface 104, a display source 106 is writing into the primary presentation surface a frame that it wishes displayed. The display source is anything that produces output for display on the display device: it may be a user application, the operating system of the computing device 100, or a firmware-based routine. For most of the present discussion, no distinction is drawn between these various display sources: they all may be sources of display information and are all treated basically alike.

The system of FIG. 1*a* is too simple for many applications because the display source 106 is writing to the primary presentation surface 104 at the same time that the display device 102 is reading from it. The display device's read may either retrieve one complete frame written by the display source or may instead retrieve portions of two successive frames. In the latter case, the boundary between portions of the two frames may produce on the display device an annoying visual artifact called "tearing."

Figure 1B:
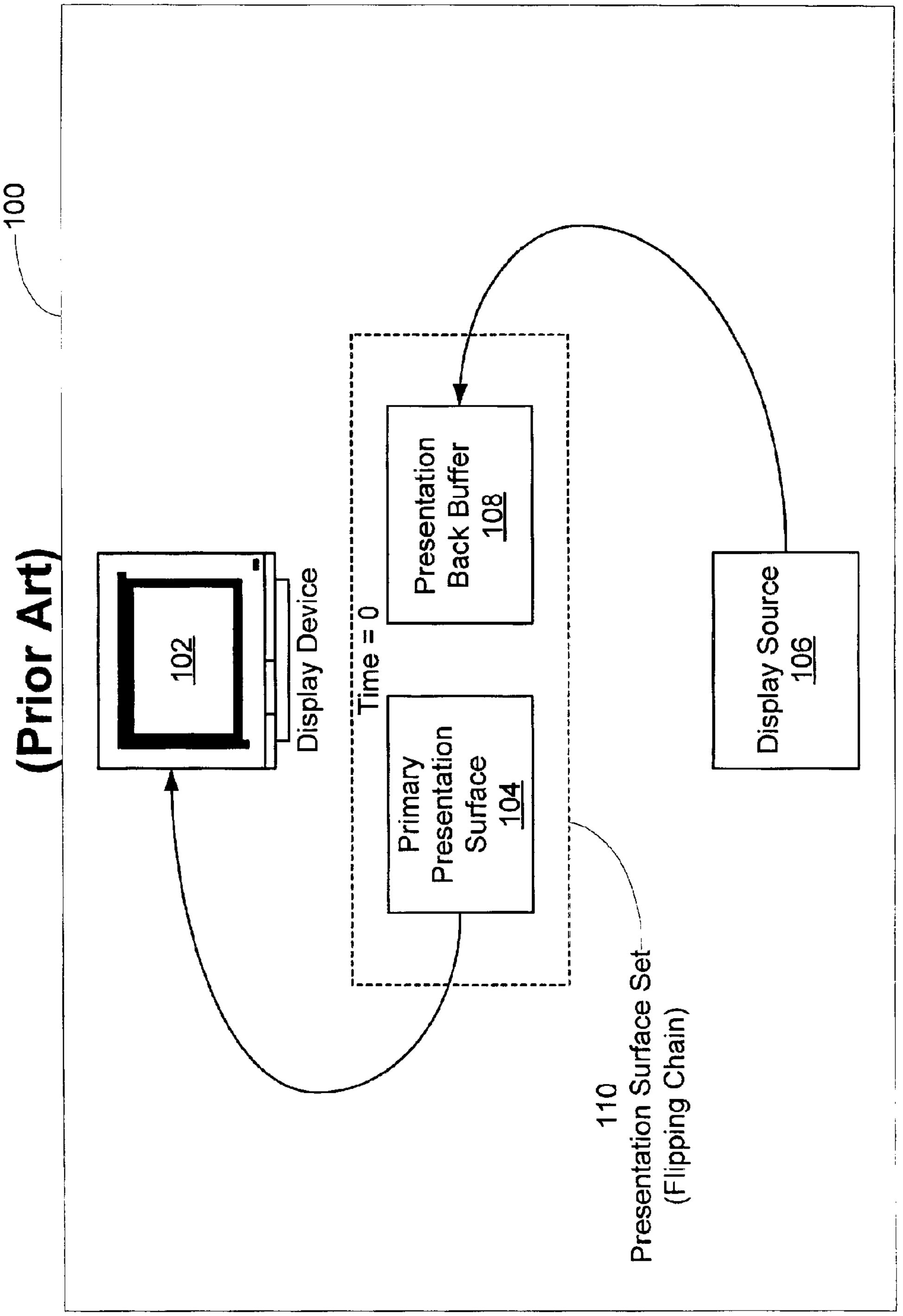
FIG. 1b (Prior Art)
Figure 1C:
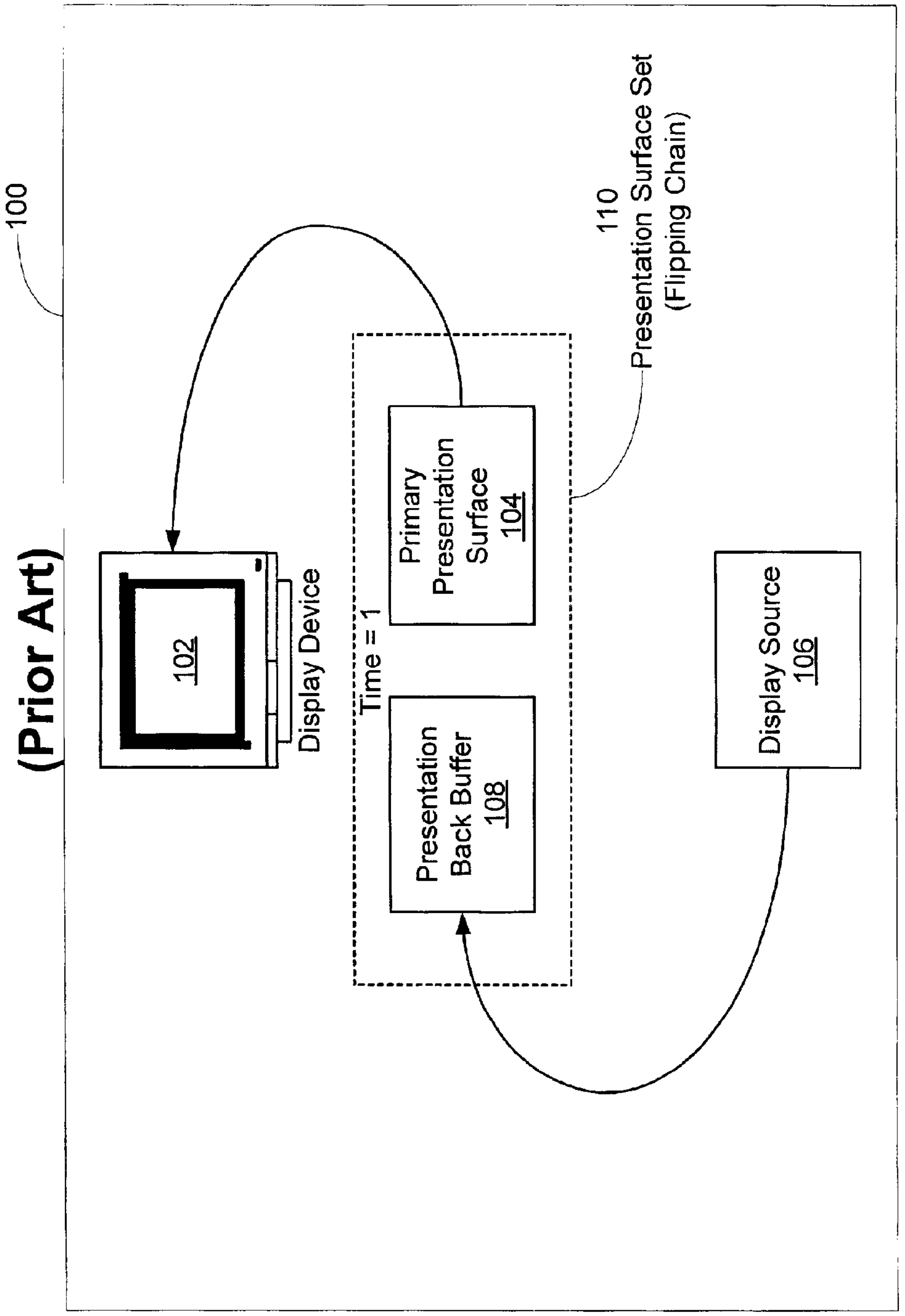
FIG. 1c (Prior Art)

FIGS. 1*b* and 1*c* show a standard way to avoid tearing. The video memory associated with the display device 102 is expanded into a presentation surface set 110. The display device still reads from the primary presentation surface 104 as described above with reference to FIG. 1*a*. However, the display source 106 now writes into a separate buffer called the presentation back buffer 108. The display source's writing is uncoupled from, and so does not interfere with, the display device's reading. Periodically, at the refresh rate, the buffers in the presentation surface set are "flipped," that is, the buffer that was the presentation back buffer and that contains the latest frame written by the display source becomes the primary presentation surface. The display device then reads from this new primary presentation surface and displays the latest frame. Also during the flip, the buffer that was the primary presentation surface becomes the presentation back buffer, available for the display source to write into it the next frame to be displayed. FIG. 1*b* shows the buffers at Time T=0, and, FIG. 1*c* shows the buffers after a flip, one refresh period later, at Time T=1. From a hardware perspective, flipping for analog monitors occurs when the electron beam that "paints" the monitor's screen has finished painting one frame and is moving back to the top of the screen to start painting the next frame. This is called the vertical synchronization event or VSYNC.

Figure 1D:
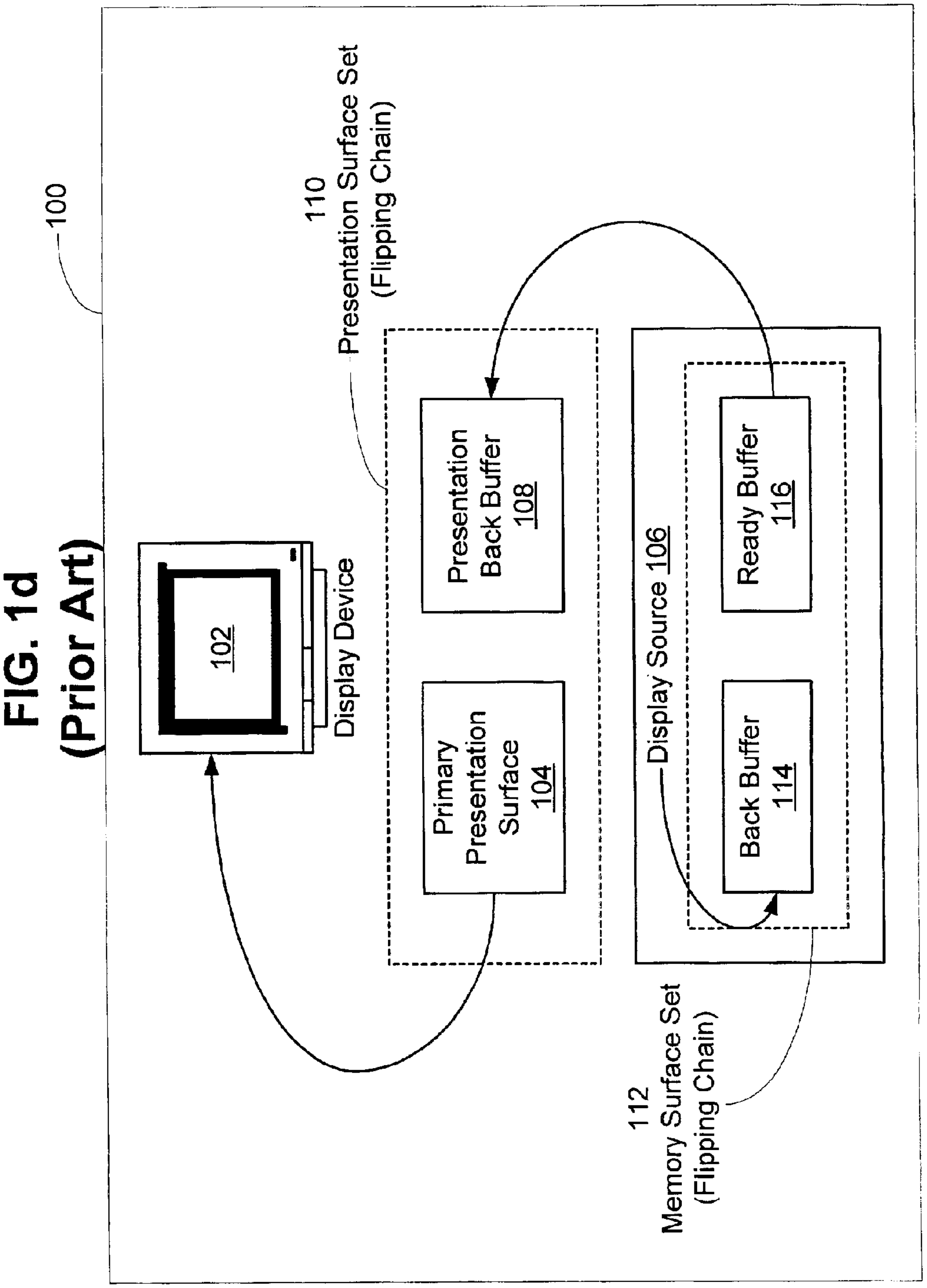
FIG. 1d (Prior Art)

The discussion so far focuses on presenting frames for display. Before a frame is presented for display, it must, of course, be composed by a display source 106. With FIG. 1*d*, the discussion turns to the frame composition process. Some display sources work so quickly that they simply compose their display frames as they write into the presentation back buffer 108. In general, however, this is too limiting. For many applications, the time needed to compose frames varies from frame to frame. For example, video is often stored in a compressed format, the compression based in part on the differences between a frame and its immediately preceding frame. If a frame differs considerably from its predecessor, then a display source playing the video may consume a great deal of computational resources for the decompression, while less radically different frames require less computation. As another example, composing frames in a video game may similarly require more or less computational power depending upon the circumstances of the action portrayed. To smooth out differences in computational requirements, many display sources create memory surface sets 112. Composition begins in a "back" buffer 114 in the memory surface set, and the frames proceed along a compositional pipeline until they are fully composed and ready for display in the "ready" buffer 116. The frame is transferred from the ready buffer to the presentation back buffer. With this technique, the display source presents its frames for display at regular intervals regardless of the varying amounts of time consumed during the composition process. While the memory surface set 112 is shown in FIG. 1*d* as comprising only two buffers, some display sources require more or fewer buffers in the set, depending upon the complexity of their compositional tasks.

Figure 1E:
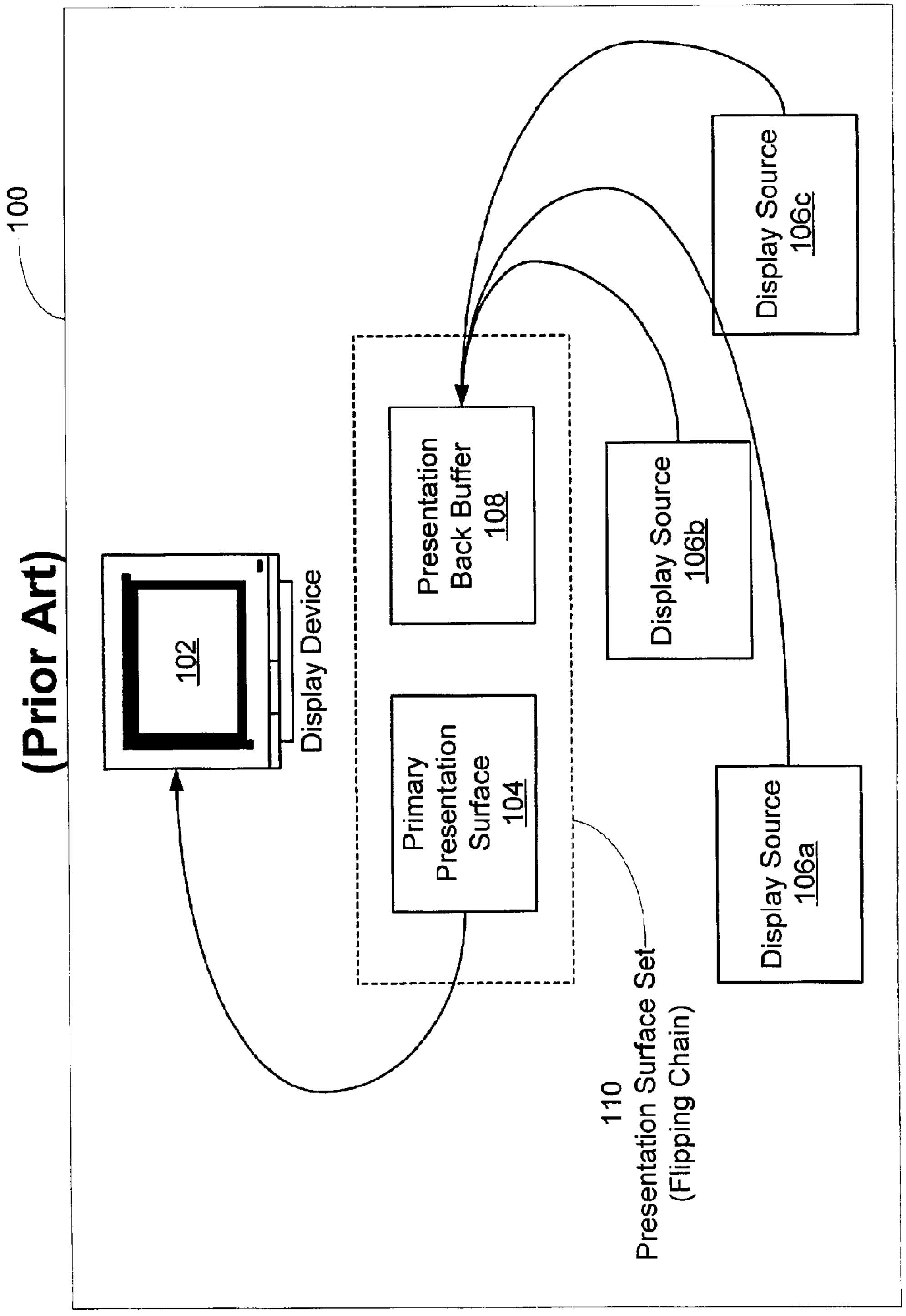
FIG. 1e (Prior Art)

FIG. 1*e* makes explicit the point, implicit in the discussion so far, that a display device 102 can simultaneously display information from a multitude of display sources, here illustrated by sources 106*a*, 106*b*, and 106*c*. The display sources may span the spectrum from, e.g., an operating system displaying a static, textual warning message to an interactive video game to a video playback routine. No matter their compositional complexity or their native video formats, all of the display sources eventually deliver their output to the same presentation back buffer 108.

As discussed above, the display device 102 presents frames periodically, at its refresh rate. However, there has been no discussion as to how or whether display sources 106 synchronize their composition of frames with their display device's refresh rate. The flow charts of FIGS. 2*a*, 2*b*, and 2*c* present often used approaches to synchronization.

Figure 2A:
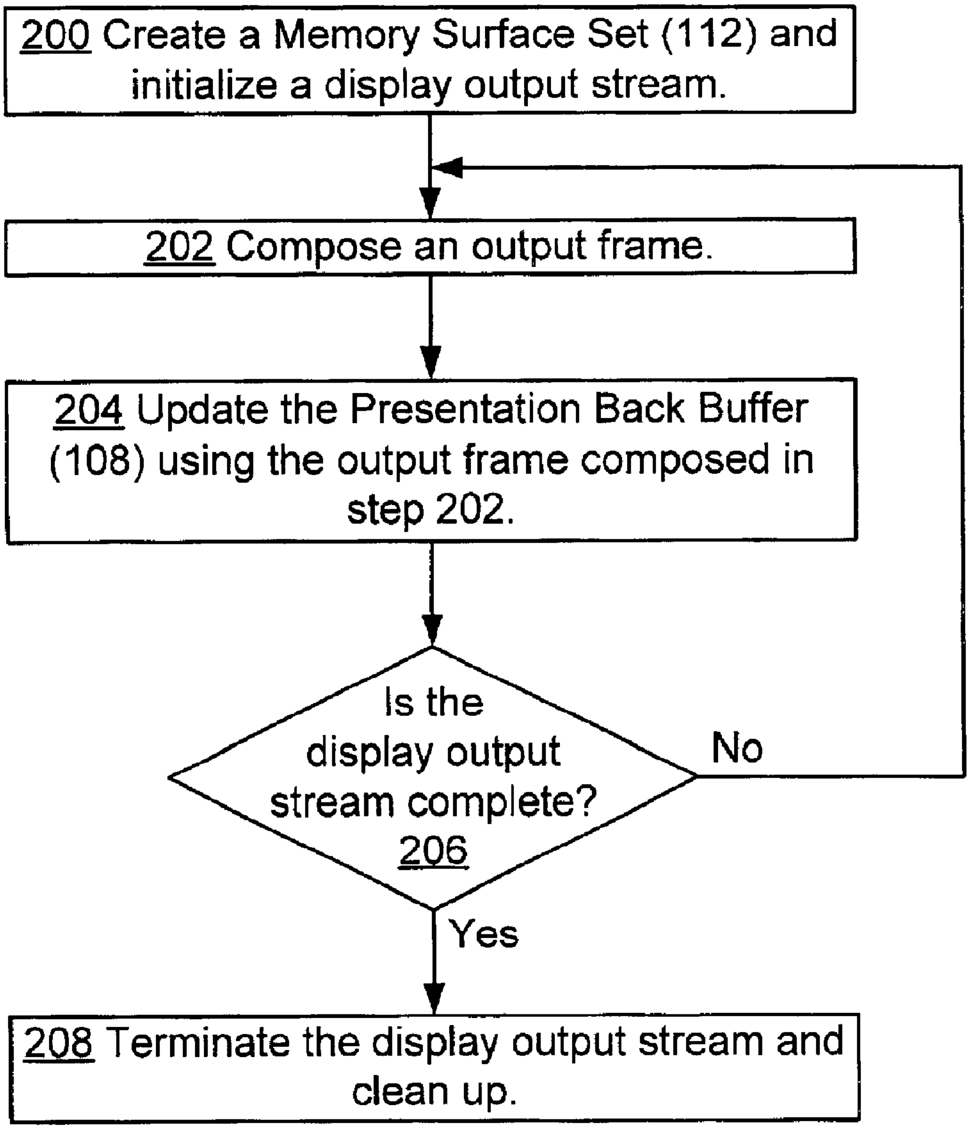
FIG. 2a (Prior Art)
FIGS. 2*a* through 2*c* are flow charts showing successively more sophisticated ways in which prior art display sources deal with display device timing; in the method of FIG. 2*a*, the display source does not have access to display timing information and is at best poorly synchronized to the display device; a display source following the method of FIG. 2*b* creates frames keyed to the current time; in the method of FIG. 2*c*, the display source attempts to coordinate the creation of frames with the estimated time of their display.
Figure 2B:
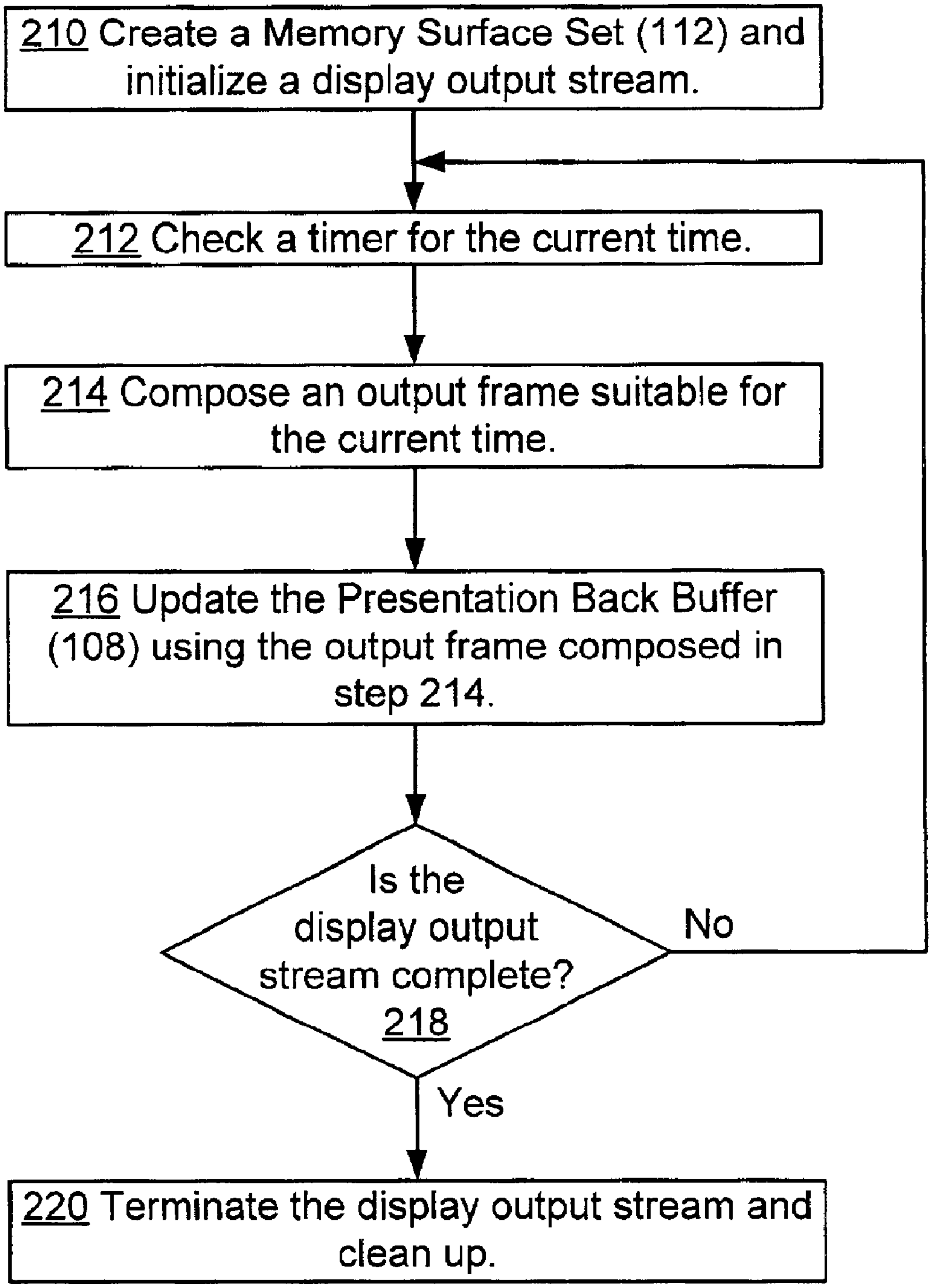
FIG. 2b (Prior Art)
Figure 2C:
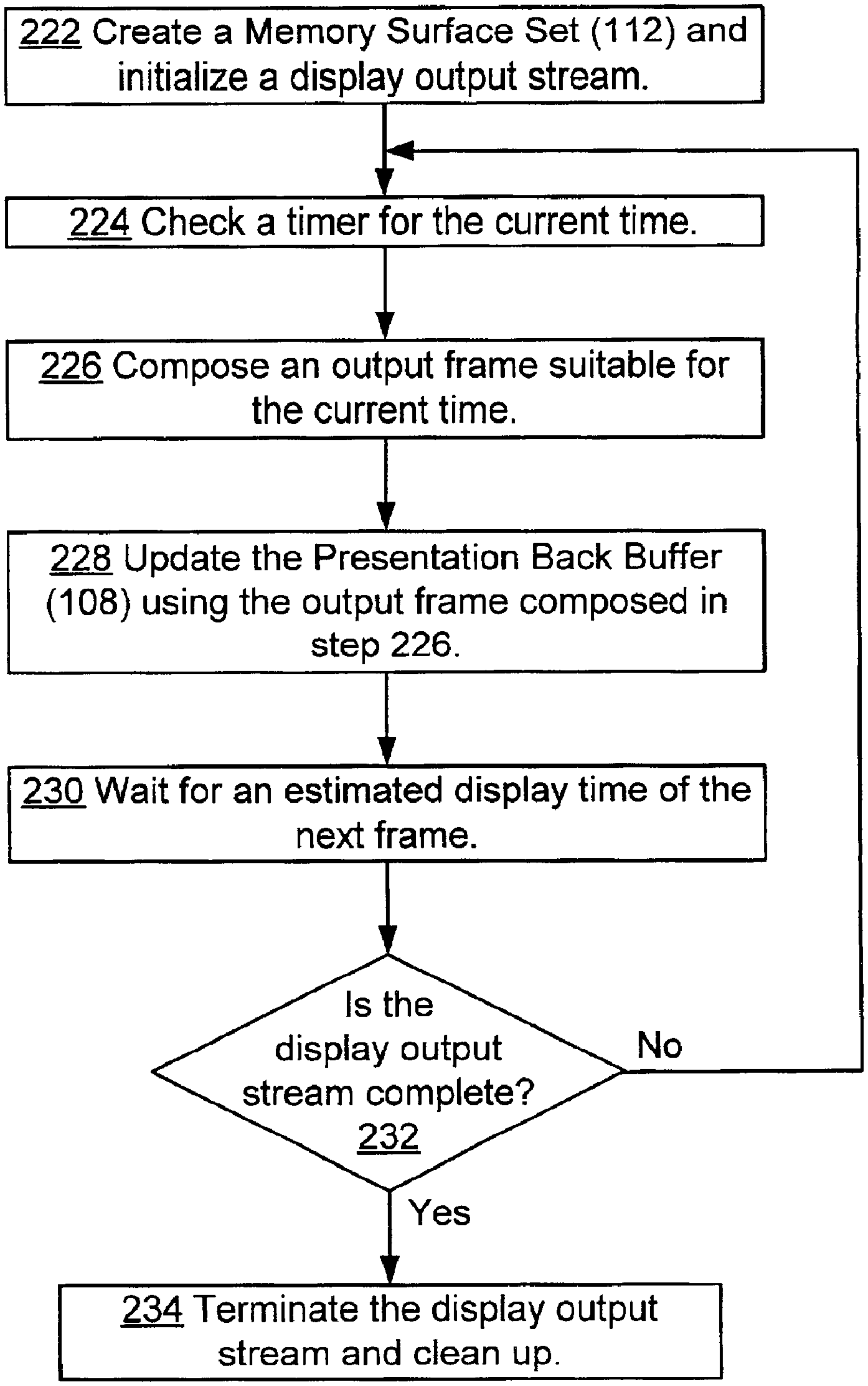
FIG. 2c (Prior Art)

A display source 106 operating according to the method of FIG. 2*a* has no access to display timing information. In step 200, the display source creates its memory surface set

112 (if it uses one) and does whatever else is necessary to initialize its output stream of display frames. In step 202, the display source composes a frame. As discussed with reference to FIG. 1*d*, the amount of work involved in composing a frame may vary over a wide range from display source to display source and from frame to frame composed by a single display source. However much work is required, by step 204 composition is complete, and the frame is ready for display. The frame is moved to the presentation back buffer 108. If the display source will continue to produce further frames, then in step 206 it loops back to compose the next frame in step 202. When the entire output stream has been displayed, the display source cleans up and terminates in step 208.

In this method, there may or may not be an attempt in step 204 to synchronize frame composition with the display device 102's refresh rate. If there is no synchronization attempt, then the display source 106 composes frames as quickly as available resources allow. The display source may be wasting significant resources of its host computing device 100 by composing, say, 1500 frames every second when the display device can only show, say, 72 frames a second. In addition to wasting resources, the lack of display synchronization may prevent synchronization between the video stream and another output stream, such as a desired synchronization of an audio clip with a person's lips moving on the display device. On the other hand, step 204 may be synchronous, throttling composition by only permitting the display source to transfer one frame to the presentation back buffer 108 in each display refresh cycle. In such a case, the display source may waste resources not by drawing extra, unseen frames but by constantly polling the display device to see when it will accept delivery of the next frame.

The simple technique of FIG. 2*a* has a disadvantage in addition to being wasteful of resources. Whether or not step 204 synchronizes the frame composition rate to the display device 102's refresh rate, the display source 106 does not have access to display timing information. The stream of frames produced by the display source runs at different rates on different display devices. For example, an animation moving an object 100 pixels to the right in ten-pixel increments takes ten frames regardless of the display refresh rate. The ten-frame animation would run in 10/72 second (13.9 ms) on a 72 Hz display and 10/85 second (11.8 ms) on an 85 Hz display.

The method of FIG. 2*b* is more sophisticated than that of FIG. 2*a*. In step 212, the display source 106 checks for the current time. Then in step 214, it composes a frame appropriate to the current time. Using this technique allows the display source to avoid the problem of different display rates discussed immediately above. This method has its own faults, however. It depends upon a low latency between checking the time in step 212 and displaying the frame in step 216. The user may notice a problem if the latency is so large that the composed frame is not appropriate for the time at which it is actually displayed. Variation in the latency, even if the latency is always kept low, may also create jerkiness in the display. This method retains the disadvantages of the method of FIG. 2*a* of wasting resources whether or not step 216 attempts to synchronize the rates of frame composition and display.

The method of FIG. 2*c* attempts to directly address the issue of resource waste. It generally follows the steps of the method of FIG. 2*b* until a composed frame is transferred to the presentation back buffer 108 in step 228. Then, in step 230, the display source 106 waits a while, suspending its execution, before returning to step 224 to begin the process of composing the next frame. This waiting is an attempt to produce one frame per display refresh cycle without incurring the resource costs of polling. However, the amount of time to wait is based on the display source's estimate of when the display device 102 will display the next frame. It is only an estimate because the display source does not have access to timing information from the display device. If the display source's estimate is too short, then the wait may not be long enough to significantly lessen the waste of resources. Worse yet, if the estimate is too long, then the display source may fail to compose a frame in time for the next display refresh cycle. This results in a disturbing frame skip.

II. An Exemplary Computing Environment

Figure 3:
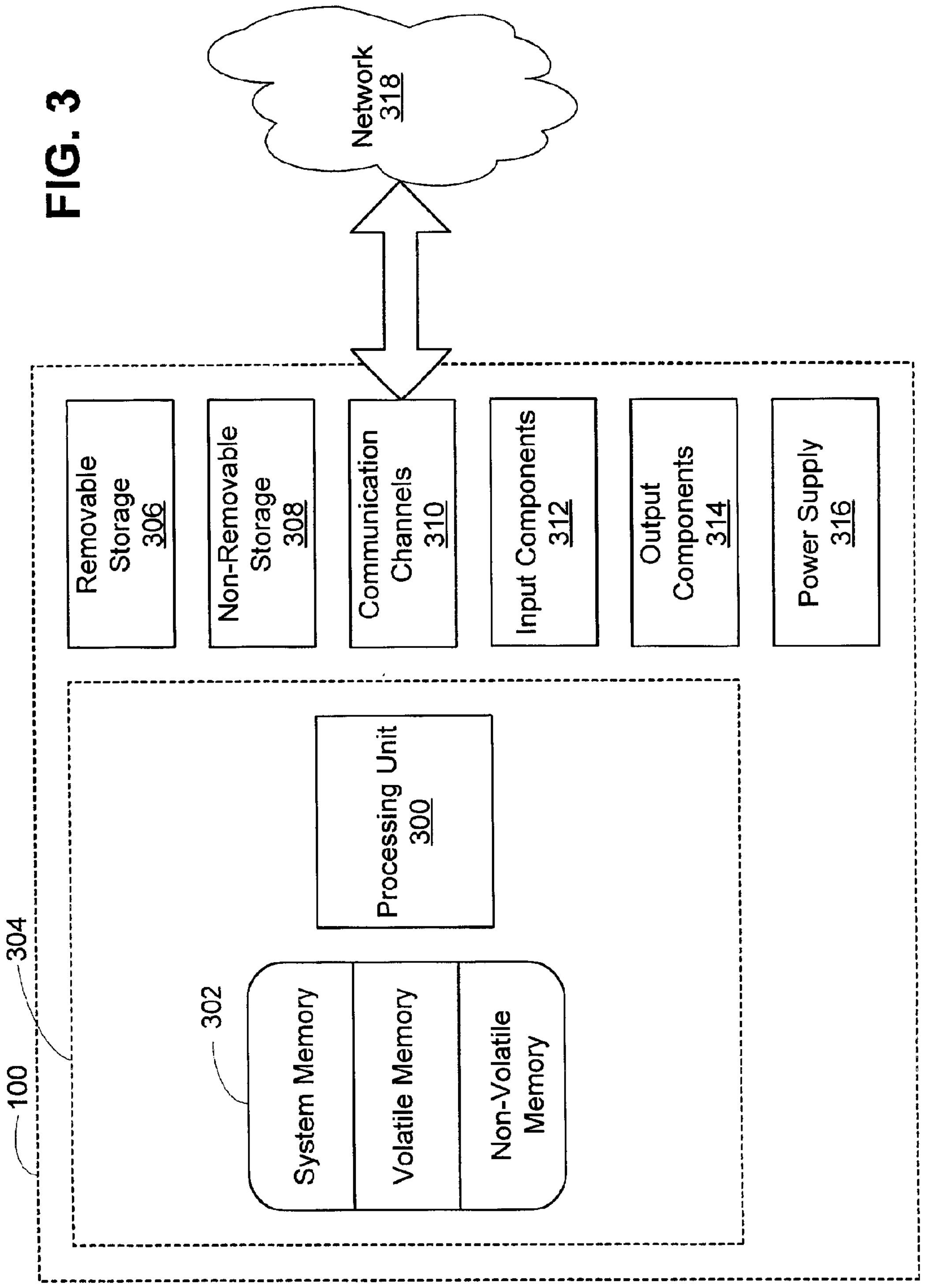
FIG. 3 is a block diagram generally illustrating an exemplary computer system that supports the present invention.

The computing device 100 of FIG. 1*a* may be of any architecture. FIG. 3 is a block diagram generally illustrating an exemplary computer system that supports the present invention. Computing device 100 is only one example of a suitable environment and is not intended to suggest any limitation as to the scope of use or functionality of the invention. Neither should computing device 100 be interpreted as having any dependency or requirement relating to any one or combination of components illustrated in FIG. 3. The invention is operational with numerous other general-purpose or special-purpose computing environments or configurations. Examples of well-known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, computing device 100 typically includes at least one processing unit 300 and memory 302. The memory 302 may be volatile (such as RAM), non-volatile (such as ROM, flash memory, etc.), or some combination of the two. This most basic configuration is illustrated in FIG. 3 by the dashed line 304. The computing device may have additional features and functionality. For example, computing device 100 may include additional storage (removable and non-removable) including, but not limited to, magnetic and optical disks and tape. Such additional storage is illustrated in FIG. 3 by removable storage 306 and non-removable storage 308. Computer-storage media include volatile and non-volatile, removable and non-removable, media implemented in any method or technology for storage of information such as computer-readable instructions, data structures, program modules, or other data. Memory 302, removable storage 306, and non-removable storage 308 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 100. Any such computer-storage media may be part of device 100. Device 100 may also contain communications channels 310 that allow the device to communicate with other devices. Communications channels 310 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. Computing device 100 may also have input devices 312 such as a keyboard, mouse, pen, voice-input device, touch-input device, etc. Output devices 314 such as a display 102, speakers, printer, etc., may also be included. All these devices are well know in the art and need not be discussed at length here.

III. An Intelligent Interface: The Graphics Arbiter

Figure 4:
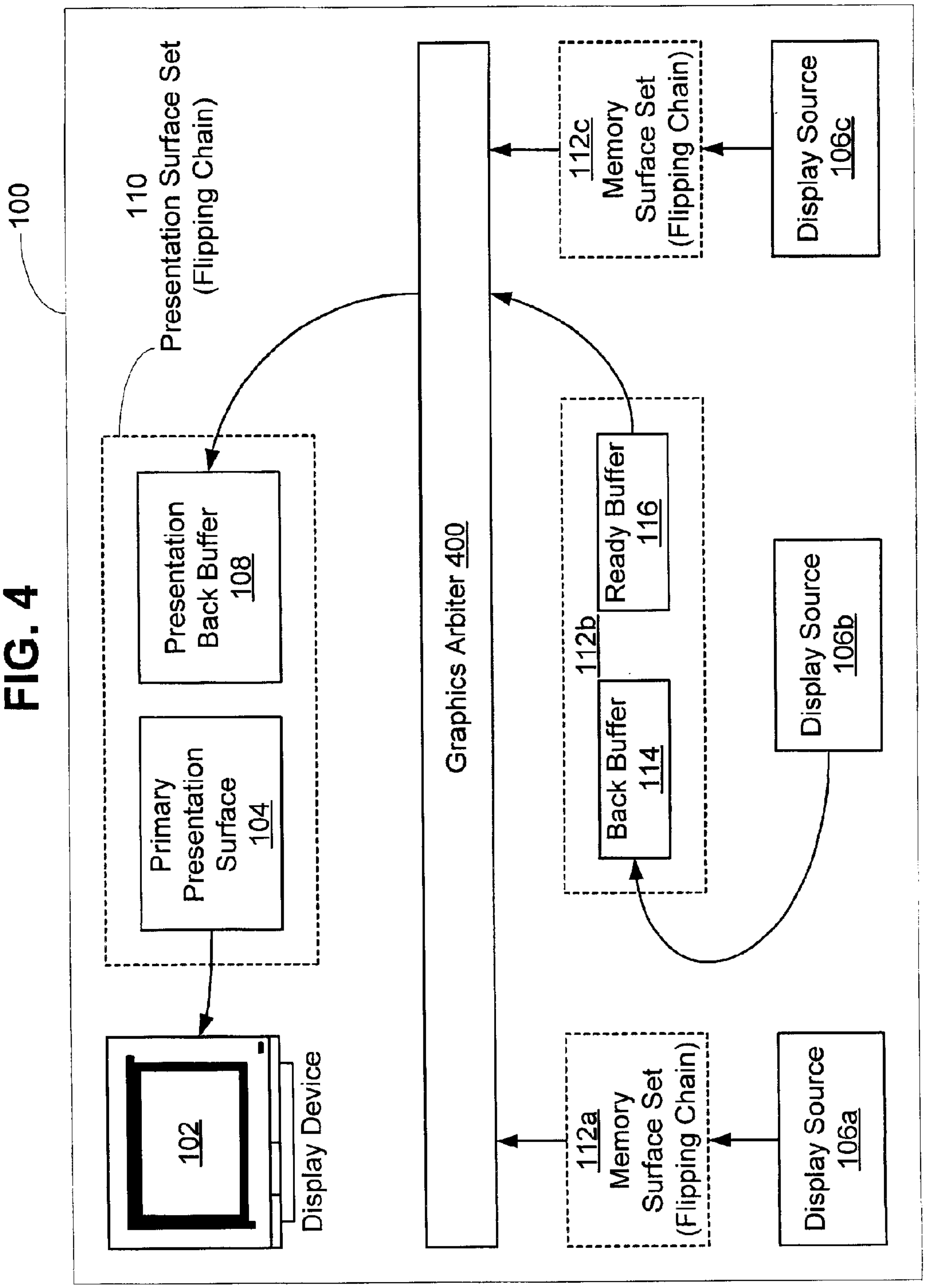
FIG. 4 is a block diagram introducing the graphics arbiter as an intelligent interface.

An intelligent interface is placed between the display sources 106*a*, 106*b*, and 106*c* and the presentation surface 104 of the display device 102. Represented by the graphics arbiter 400 of FIG. 4, this interface gathers knowledge of the overall display environment and provides that knowledge to the display sources so that they may more efficiently perform their tasks. As an illustration of the graphics arbiter's knowledge-gathering process, the video information flows in FIG. 4 are different from those of FIG. 1*d*. The memory surface sets 112*a*, 112*b*, and 112*c* are shown outside their display sources rather than inside them as in FIG. 1*d*. Instead of allowing each display source to transfer its frame to the presentation back buffer 108, the graphics arbiter controls these transfers, translating video formats if necessary. By means of its information access and control, the graphics arbiter coordinates the activities of multiple, interacting display sources in order to create a seamlessly integrated display for the user of the computing device 100. The specifics of the graphics arbiter's operation and the graphics effects made possible thereby are the subjects of this section.

While the present application is focused on the inventive features provided by the new graphics arbiter 400, there is no attempt to exclude from the graphics arbiter's functionality any features provided by traditional graphics systems. For example, traditional graphics systems often provide video decoding and video digitization features. The present graphics arbiter 400 may also provide such features in conjunction with its new features.

Figure 5:
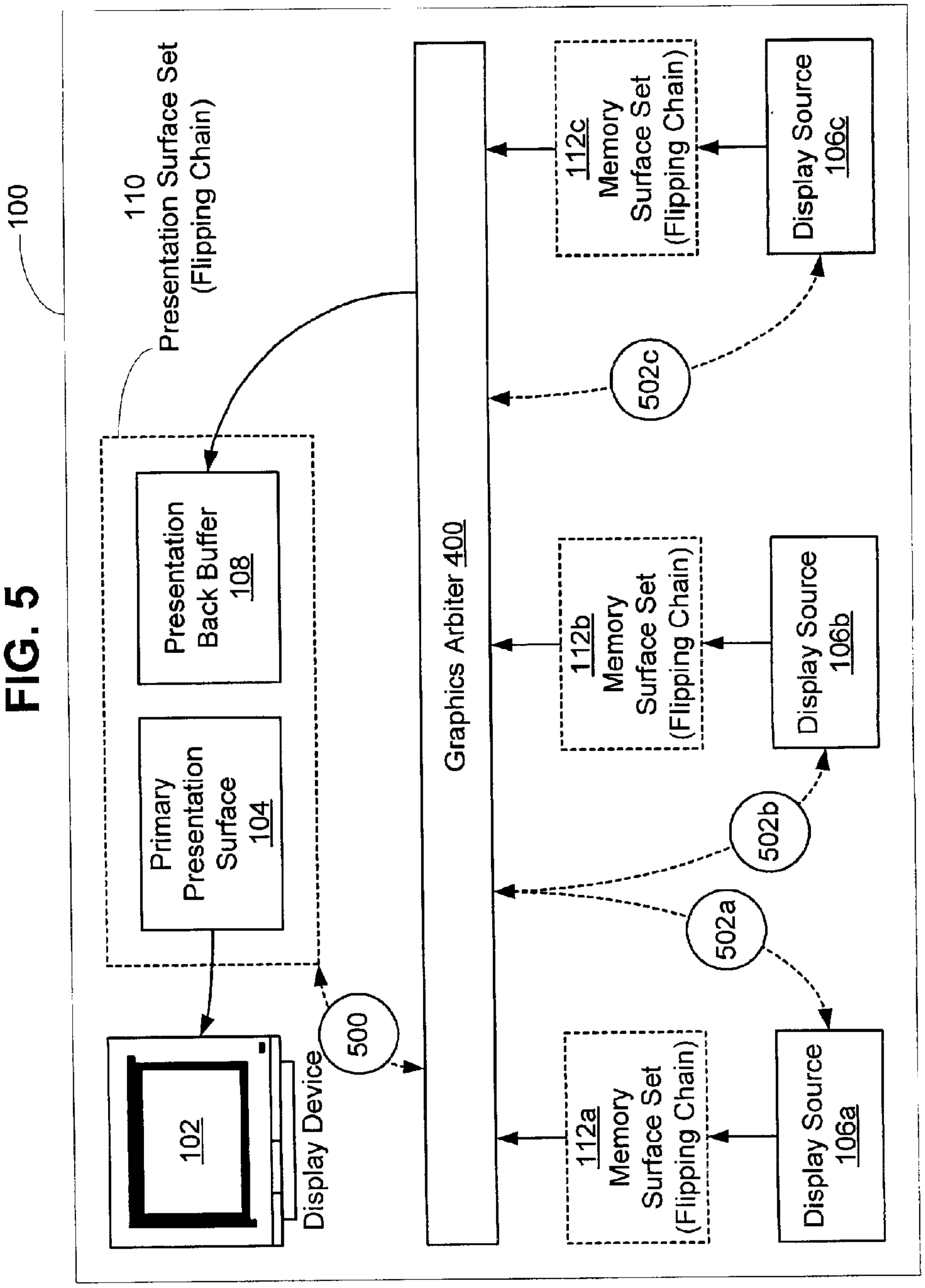
FIG. 5 is a block diagram illustrating the command and control information flows enabled by the graphics arbiter.

FIG. 5 adds command and control information flows to the video information flows of FIG. 4. One direction of the two-way flow 500 represents the graphics arbiter 400's access to display information, such as the VSYNC indication, from the display device 102. In the other direction, flow 500 represents the graphics arbiter's control over flipping in the presentation surface set 110. Two-way flows 502*a*, 502*b*, and 502*c* represent both the graphics arbiter's provision to the display sources 106*a*, 106*b*, and 106*c*, respectively, of display environment information, such as display timing and occlusion, as well as the display sources' provision of information to the graphics arbiter, such as per-pixel alpha information, usable by the graphics arbiter when combining output from multiple display sources.

This intelligent interface approach enables a large number of graphics features. To frame the discussion of these features, this discussion begins by describing exemplary methods of operation usable by the graphics arbiter 400 (in FIG. 6) and by the display sources 106*a*, 106*b*, and 106*c* (in FIGS. 7*a* and 7*b*). After reviewing flow charts of these methods, the discussion examines the enabled features in greater detail.

Figure 6:
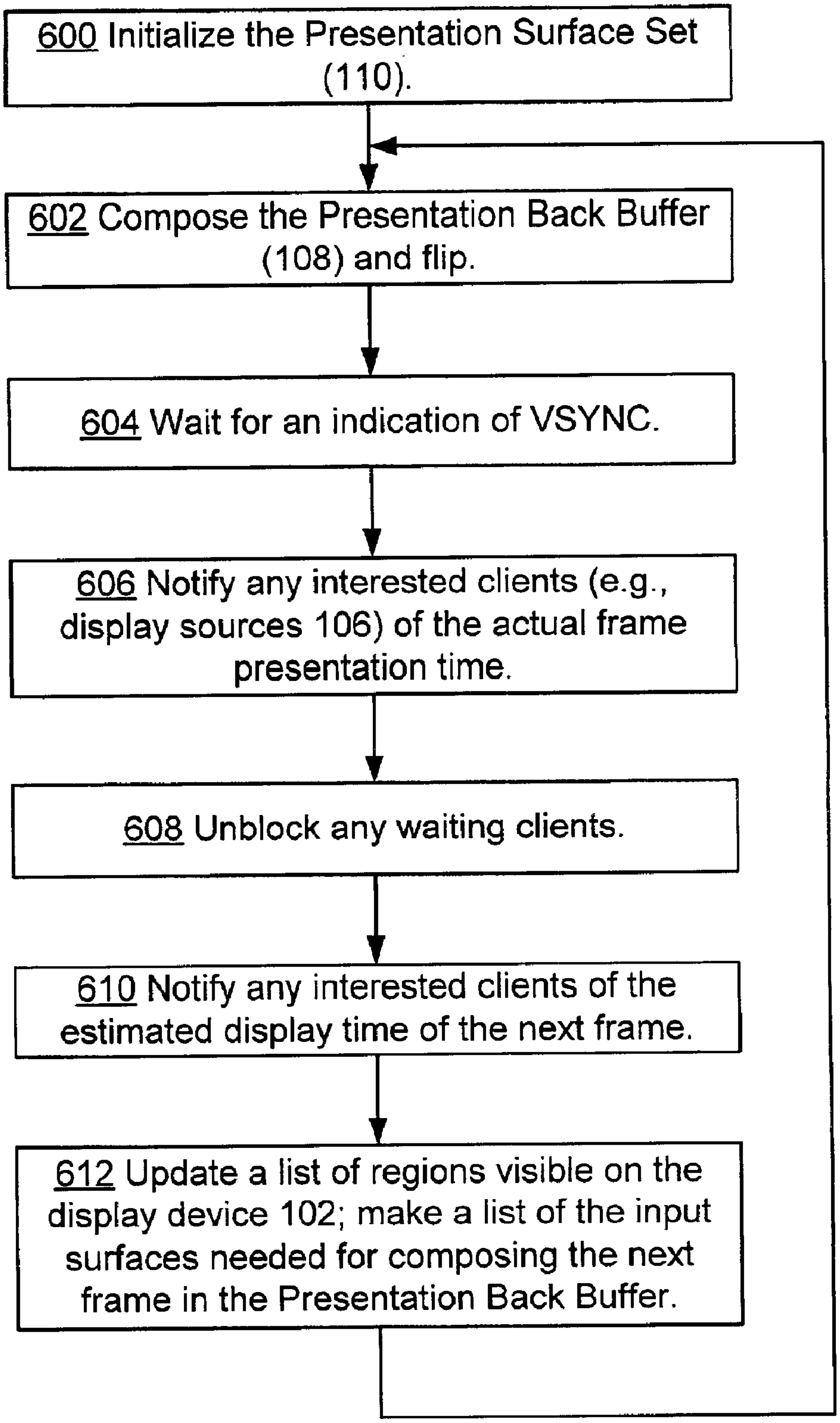
FIG. 6 is a flow chart of an embodiment of the method practiced by the graphics arbiter.

In the flow chart of FIG. 6, the graphics arbiter 400 begins in step 600 by initializing the presentation surface set 110 and doing whatever else is necessary to prepare the display device 102 to receive display frames. In step 602, the graphics arbiter reads from the ready buffers 116 in the memory surface sets 112*a*, 112*b*, and 112*c* of the display sources 106*a*, 106*b*, and 106*c* and then composes the next display frame in the presentation back buffer 108. By putting this composition under the control of the graphics arbiter, this approach yields a unity of presentation not readily achievable when each display source individually transfers its display information to the presentation back buffer. When the composition is complete, the graphics arbiter flips the buffers in the presentation surface set 110, making the frame composed in the presentation back buffer available to the display device 102. During its next refresh cycle, the display device 102 reads and displays the new frame from the new primary presentation surface 104.

One of the more important aspects of the intelligent interface approach is the use of the display device 102's VSYNC indications as a clock that drives much of the work in the entire graphics system. The effects of this system-wide clock are explored in great detail in the discussions below of the particular features enabled by this approach. In step 604, the graphics arbiter 400 waits for VSYNC before beginning another round of display frame composition.

Using the control flows 502*a*, 502*b*, and 502*c*, the graphics arbiter 400 notifies, in step 606, any interested clients (e.g., display source 106*b*) of the time at which the composed frame was presented to the display device 102. Because this time comes directly from the graphics arbiter that flips the presentation surface set 110, this time is more accurate than the display source-provided timer in the methods of FIGS. 2*a* and 2*b*.

When in step 608 the VSYNC indication arrives at the graphics arbiter 400 via information flow 500, the graphics arbiter unblocks any blocked clients so that can perform their part of the work necessary for composing the next frame to be displayed. (Clients may block themselves after they complete the composition of a display frame, as discussed below in reference to FIG. 7*a*.) In step 610, the graphics arbiter informs clients of the estimated time that the next frame will be displayed. Based as it is on VSYNC generated by the display hardware, this estimate is much more accurate than anything the clients could have produced themselves.

While the graphics arbiter 400 is proceeding through steps 608, 610, and 612, the display sources 106*a*, 106*b*, and 106*c* are composing their next frames and moving them to the ready buffers 116 of their memory surface sets 112*a*, 112*b*, and 112*c*, respectively. However, some display sources may not need to prepare full frames because their display output is partially or completely occluded on the display device 102 by display output from other display sources. In step 612, the graphics arbiter 400, with its system-wide knowledge, creates a list of what will actually be seen on the display device. It provides this information to the display sources so that they need not waste resources in developing information for the occluded portions of their output. The graphics arbiter itself preserves system resources, specifically video memory bandwidth, by using this occlusion information when, beginning the loop again in step 602, it reads only non-occluded information from the ready buffers in preparation for composing the next display frame in the presentation back buffer 108.

In a manner similar to its use of occlusion information to conserve system resources, the graphics arbiter 400 can detect that portions of the display have not changed from one frame to the next. The graphics arbiter compares the currently displayed frame with the information in the ready buffers 116 of the display sources. Then, if the flipping of the presentation surface set 110 is non-destructive, that is, if the display information in the primary presentation surface 104 is retained when that buffer becomes the presentation back buffer 108, then the graphics arbiter need only, in step 602, write those portions of the presentation back buffer that have changed from the previous frame. In the extreme case of nothing changing, the graphics arbiter in step 602 does one of two things. In a first alternative, the graphics arbiter does nothing at all. The presentation surface set is not flipped, and the display device 102 continues to read from the same, unchanged primary presentation surface. In a second alternative, the graphics arbiter does not change the information in the presentation back buffer, but the flip is performed as usual. Note that neither of these alternatives is available in display systems in which flipping is destructive. In this case, the graphics arbiter begins step 602 with an empty presentation back buffer and must entirely fill the presentation back buffer regardless of whether or not anything has changed. Portions of the display may change either because a display source has changed its output or because the occlusion information gathered in step 612 has changed.

Figure 7A:
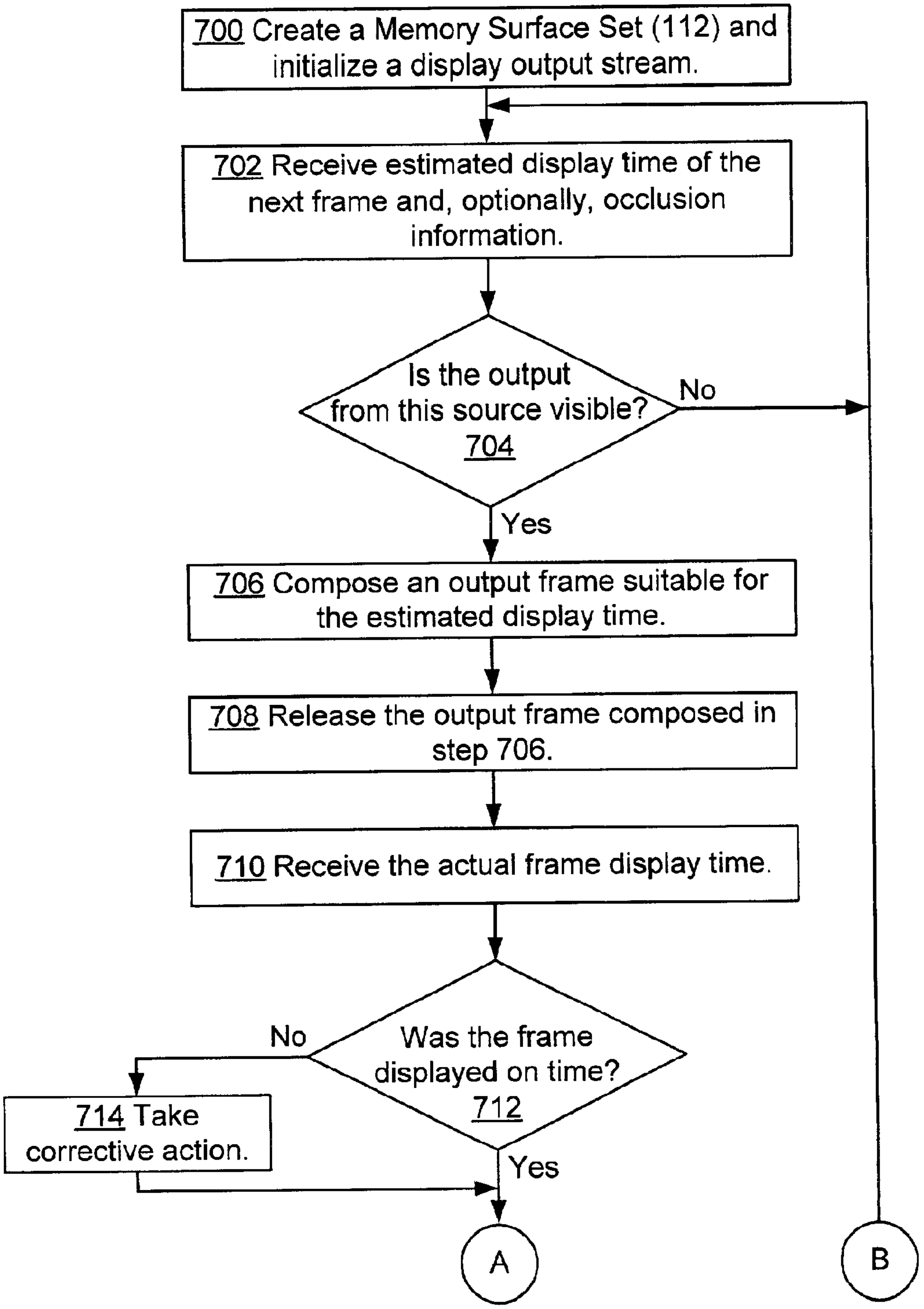
FIGS. 7*a* and 7*b* are a flowchart of a method usable by a display source when interacting with the graphics arbiter.
Figure 7B:
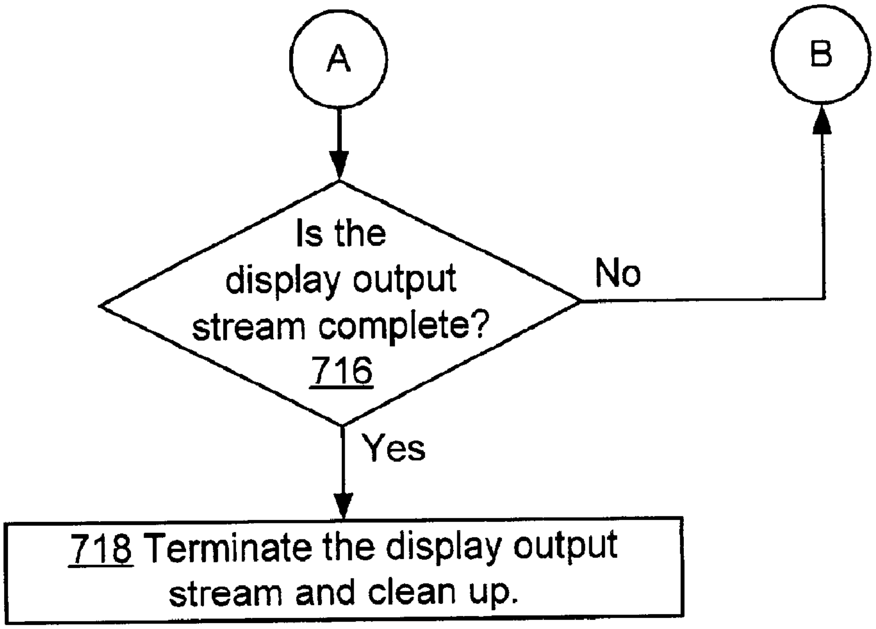

At the same time that the graphics arbiter 400 is looping through the method of FIG. 6, the display sources 106*a*, 106*b*, and 106*c* are looping through their own methods of operation. These methods vary greatly from display source to display source. The techniques of the graphics arbiter operate with all types of display sources, including prior art display sources that ignore the information provided by the graphics arbiter (such as those illustrated in FIGS. 2*a*, 2*b*, and 2*c*), but an increased level of advantages is provided when the display sources fully use this information. FIGS. 7*a* and 7*b* present an exemplary display source method with some possible options and variations. In step 700, the display source 106*a* creates its memory surface set 112*a* (if it uses one) and does whatever else is necessary to begin producing its stream of display frames.

In step 702, the display source 106*a* receives an estimate of when the display device 102 will present its next frame. This is the time sent by the graphics arbiter 400 in step 610 of FIG. 6 and is based on the display device's VSYNC indication. If the graphics arbiter provides occlusion information in step 612, then the display source also receives that information in step 702. Some display sources, particularly older ones, ignore the occlusion information. Others use the information in step 704 to see if any or all of their output is occluded. If its output is completely occluded, then the display source need not produce a frame and returns to step 702 to await the reception of an estimate of the display time of the next frame.

If at least some of the display source 106*a*'s output is visible (or if the display source ignores occlusion information), then in step 706 the display source composes a frame, or at least the visible portions of a frame. Various display sources use various techniques to incorporate occlusion information so that they need only draw the visible portions of a frame. For example, three-dimensional (3D) display sources that use Z-buffering to indicate what items in their display lie in front of what other items can manipulate their Z-buffer values in the following manner. They initialize the Z-buffer values of occluded portions of the display as if those portions were items lying behind other items. Then, the Z test will fail for those portions. When these display sources use 3D hardware provided by many graphics arbiters 400 to compose their frames, the hardware runs much faster on the occluded portions because the hardware need not fetch texture values or alpha-blend color buffer values for portions failing the Z test.

The frame composed in step 706 corresponds to the estimated display time received in step 702. Many display sources can render a frame to correspond to any time in a continuous domain of time values, for example by using the estimated display time as an input value to a 3D model of the scene. The 3D model interpolates angles, positions, orientations, colors, and other variables according to the estimated display time. The 3D model renders the scene to create an exact correspondence between the scene's appearance and the estimated display time.

Note that steps 702 and 706 synchronize the display source 106*a*'s frame composition rate with the display device 102's refresh rate. By waiting for the estimated display time in step 702, which is sent by the graphics arbiter 400 in step 610 of FIG. 6 once per refresh cycle, one frame is composed (unless it is completely occluded) for every frame presented. No extra, never-to-be-seen frames are produced and no resources are wasted in polling the display device for permission to deliver the next frame. The synchronization also removes the display source's dependence upon the provision of low latency by the display system. (See for comparison the method of FIG. 2*a*.) In step 708, the composed frame is placed in the ready buffer 116 of the memory surface set 112*a* and released to the graphics arbiter to be read in the graphics arbiter's composition step 602.

Optionally, the display source 106*a* receives in step 710 the actual display time of the frame it composed in step 706. This time is based on the flipping of the buffers in the presentation surface set 110 and is sent by the graphics arbiter 400 in its step 606. The display source 106*a* checks this time in step 712 to see if the frame was presented in a timely fashion. If it was not, then the display source 106*a* took too long to compose the frame, and the frame was consequently not ready at the estimated display time received in step 702. The display source 106*a* may have attempted to compose a frame that is too computationally complex for the present display environment, or other display sources may have demanded too many resources of the computing device 100. In any case, in step 714 a procedurally flexible display source takes corrective action in order to keep up with the display refresh rate. The display source 106*a*, for example, decreases the quality of its composition for a few frames. This ability to intelligently degrade frame quality to keep up with the display refresh rate is an advantage of the system-wide knowledge gathered by the graphics arbiter 400 and reflected in the use of VSYNC as a system-wide clock.

If the display source 106*a* has not yet completed its display task, then in step 716 of FIG. 7*b* it loops back to step 702 and waits for the estimated display time of the next frame. When the display task is complete, the display source terminates and cleans up in step 718.

In some embodiments, the display source 106*a* blocks its own operation before looping back to step 702 (from either steps 704 or 716). This frees up resources for use by other applications on the computing device 100 and ensures that the display source does not waste resources either in producing extra, never-to-be-seen frames or in polling for permission to transfer the next frame. The graphics arbiter 400 unblocks the display source in step 608 of FIG. 6 so that the display source can begin in step 702 to compose its next frame. By controlling the unblocking itself, the graphics arbiter reliably conserves more resources, while avoiding the problem of skipped frames, than does the estimated time-based waiting of the method of FIG. 2*c*.

IV. An Expanded Discussion of a Few Features Enabled by the Intelligent Interface A. Format Translation The graphics arbiter 400's access to the memory surface sets 112*a*, 112*b*, and 112*c* of the display sources 106*a*, 106*b*, and 106*c* allows it to translate from the display format found in the ready buffers 116 into a format compatible with the display device 102. For example, video decoding standards are often based on a YUV color space, while 3D models developed for a computing device 100 generally use an RGB color space. Moreover, some 3D models use physically linear color (the scRGB standard) while others use perceptually linear color (the sRGB standard). As another example, output designed for one display resolution may need to be "stretched" to match the resolution provided by the display device. The graphics arbiter 400 may even need to translate between frame rates, for example accepting frames produced by a video decoder at NTSC's 59.94 Hz native rate and possibly interpolating the frames to produce a smooth presentation on the display device's 72 Hz screen. As yet another example of translation, the above-described mechanisms that enable a display source to render a frame for its anticipated presentation time also enable arbitrarily sophisticated deinterlacing and frame interpolation to be applied to video streams. All of these standards and variations on them may be in use at the same time on one computing device. The graphics arbiter 400 converts them all when it composes the next display frame in the presentation back buffer 108 (step 602 of FIG. 6). This translation scheme allows each display source to be optimized for whatever display format makes sense for its application and not have to change as its display environment changes.

B. Application Transformation

In addition to translating between formats, the graphics arbiter 400 can apply graphics transformation effects to the output of a display source 106*a*, possibly without intervention by the display source. These effects include, for example, lighting, applying a 3D texture map, or a perspective transformation. The display source could provide per-pixel alpha information along with its display frames. The graphics arbiter could use that information to alpha blend output from more than one display source, to, for example, create arbitrarily shaped overlays.

The output produced by a display source 106*a* and read by the graphics arbiter 400 is discussed above in terms of image data, such as bitmaps and display frames. However, other data formats are possible. The graphics arbiter also accepts as input a set of drawing instructions produced by the display source. The graphics arbiter follows those instructions to draw into the presentation surface set 110. The drawing instruction set can either be fixed and updated at the option of the display source or can be tied to specific presentation times. In processing the drawing instructions, the graphics arbiter need not use an intermediate image buffer to contain the display source's output, but rather uses other resources to incorporate the display source's output into the display output (e.g., texture maps, vertices, instructions, and other input to the graphics hardware).

Unless carefully managed, a display source 106*a* that produces drawing instructions can adversely affect occlusion. If its output area is not bounded, a higher precedence (output is in front) display source's drawing instructions could direct the graphics arbiter 400 to draw into areas owned by a lower precedence (output is behind) display source, thus causing that area to be occluded. One way to reconcile the flexibility of arbitrary drawing instructions with the requirement that the output from those instructions be bounded is to have the graphics arbiter use a graphics hardware feature called a "scissor rectangle." The graphics hardware clips its output to the scissor rectangle when it executes a drawing instruction. Often, the scissor rectangle is the same as the bounding rectangle of the output surface, causing the drawing instruction output to be clipped to the output surface. The graphics arbiter can specify a scissor rectangle before executing drawing instructions from the display source. This guarantees that the output generated by those drawing instructions does not stray outside the specified bounding rectangle. The graphics arbiter uses that guarantee to update occlusion information for display sources both in front of and behind the display source that produced the drawing instructions. There are other possible ways of tracking the visibility of display sources that produce drawing instructions, such as using Z-buffer or stencil-buffer information. An occlusion scheme based on visible rectangles is easily extensible to use scissor rectangles when processing drawing instructions.

Figure 8:
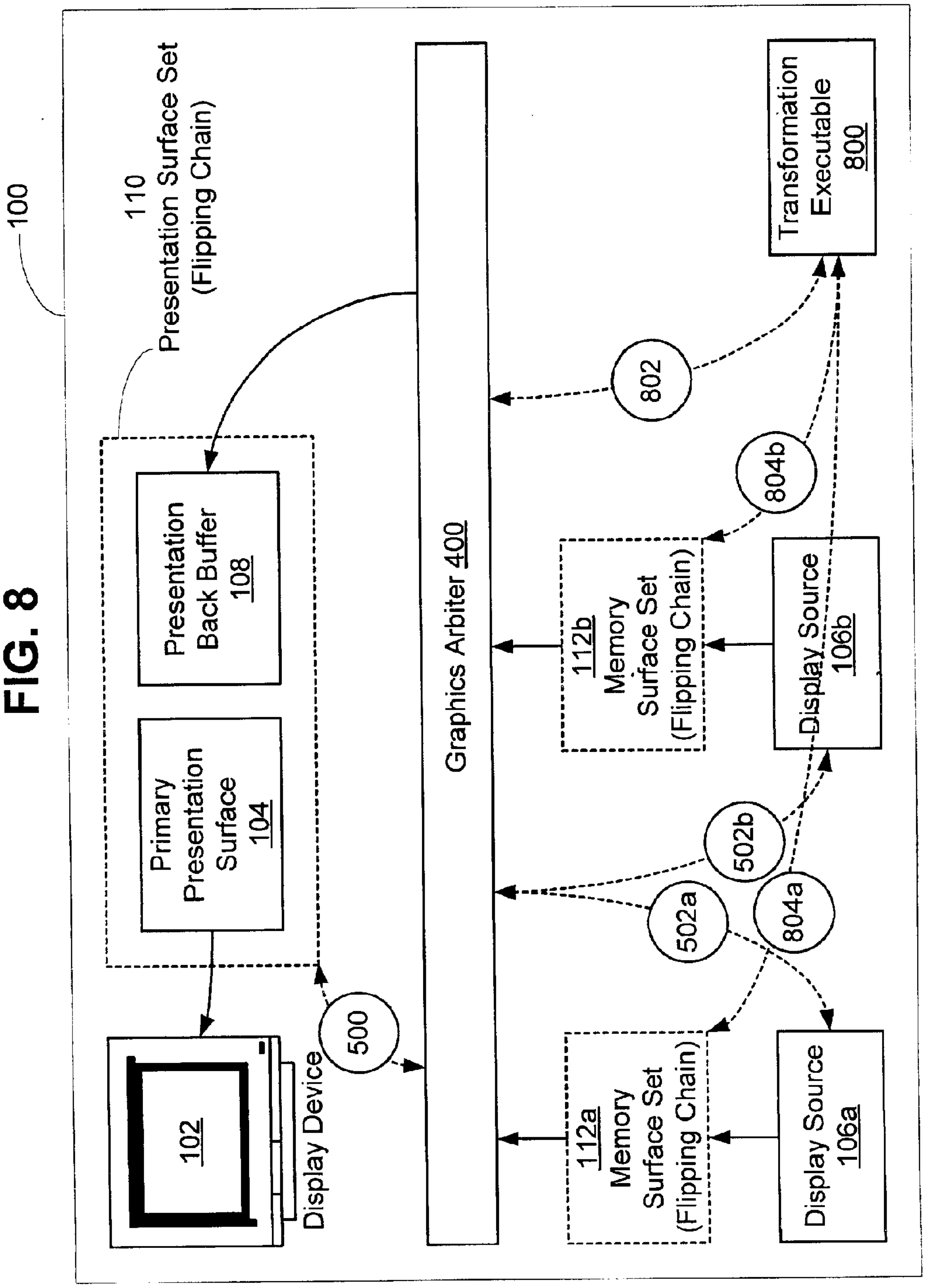
FIG. 8 is a block diagram showing how an application transforms output from one or more display sources.

FIG. 8 illustrates the fact that it may not be the graphics arbiter 400 itself that performs an application transformation. In the Figure, a "transformation executable" 800 receives display system information 802 from the graphics arbiter 400 and uses the information to perform transformations (represented by flows 804*a* and 804*b*) on the output of a display source 106*a* or on a combination of outputs from more than one display source. The transformation executable can itself be another display source, possibly integrating display information from another source with its own output. Transformation executables also include, for example, a user application that produces no display output by itself and an operating system that highlights a display source's output when it reaches a critical stage in a user's workflow.

A display source whose input includes the output from another display source can be said to be "downstream" from the display source upon whose output it depends. For example, a game renders a 3D image of a living room. The living room includes a television screen. The image on the television screen is produced by an "upstream" display source (possibly a television tuner) and is then fed as input to the downstream 3D game display source. The downstream display source incorporates the television image into its rendering of the living room. As the terminology implies, a chain of dependent display sources can be constructed, with one or more upstream display sources generating output for one or more downstream display sources. Output from the final downstream display sources is incorporated into the presentation surface set 110 by the graphics arbiter 400. Because a downstream display source may need some time to process display output from an upstream source, the graphics arbiter may see fit to offset the upstream source's timing information. For example, if the downstream display source needs one frame time to incorporate the upstream display information, then the upstream source can be given an estimated frame display time (see steps 610 in FIG. 6 and 702 in FIG. 7*a*) offset by one frame time into the future. Then, the upstream source produces a display frame appropriate to the time when it will actually appear on the display device 102. This allows, for example, synchronization of the video stream with an audio stream.

Occlusion information may be passed up the chain from a downstream display source to its upstream source. Thus, for example, if the downstream display is completely occluded, then the upstream source need not waste any time generating output that would never be seen on the display device 102.

C. An Operational Priority Scheme

Some services under the control of the graphics arbiter 400 are used both by the graphics arbiter 400 itself when it composes the next display frame in the presentation back buffer 108 and by the display sources 106*a*, 106*b*, and 106*c* when they compose their display frames in their memory surface sets 112. Because many of these services are typically provided by graphics hardware that can only perform one task at a time, a priority scheme arbitrates among the conflicting users to ensure that display frames are composed in a timely fashion. Tasks are assigned priorities. Composing the next display frame in the presentation back buffer is of high priority while the work of individual display sources is of normal priority. Normal priority operations proceed only as long as there are no waiting high priority tasks. When the graphics arbiter receives a VSYNC in step 608 of FIG. 6, normal priority operations are pre-empted until the new frame is composed. There is an exception to this pre-emption when the normal priority operation is using a relatively autonomous hardware component. In that case, the normal priority operation can proceed without delaying the high priority operation. The only practical effect of allowing the autonomous hardware component to operate during execution of a high priority command is a slight reduction in available video memory bandwidth.

Pre-emption can be implemented in software by queuing the requests for graphics hardware services. Only high priority requests are submitted until the next display frame is composed in the presentation back buffer 108. Better still, the stream of commands for composing the next frame could be set up and the graphics arbiter 400 prepared in advance to execute it on reception of VSYNC.

A hardware implementation of the priority scheme may be more robust. The graphics hardware can be set up to pre-empt itself when a given event occurs. For example, on receipt of VSYNC, the hardware could pre-empt what it was doing, process the VSYNC (that is, compose the presentation back buffer 108 and flip the presentation surface set 110), and then return to complete whatever it was doing before.

D. Using Scan Line Timing Information

While VSYNC is shown above to be a very useful system-wide clock, it is not the only clock available. Many display devices 102 also indicate when they have completed the display of each horizontal scan line. The graphics arbiter 400 accesses this information via information flow 500 of FIG. 5 and uses it to provide finer timer information. Different estimated display times are given to the display sources 106*a*, 106*b*, and 106*c* depending upon which scan line has just been displayed.

The scan line "clock" is used to compose a display frame directly in the primary presentation surface 104 (rather than in the presentation back buffer 108) without causing a display tear. If the bottommost portion of the next display frame that differs from the current frame is above the current scan line position, then changes are safely written directly to the primary presentation surface, provided that the changes are written with low latency. This technique saves some processing time because the presentation surface set 110 is not flipped and may be a reasonable strategy when the graphics arbiter 400 is struggling to compose display frames at the display device 102's refresh rate. A pre-emptible graphics engine has a better chance of completing the write in a timely fashion.

V. The Augmented Primary Surface

Figure 9:
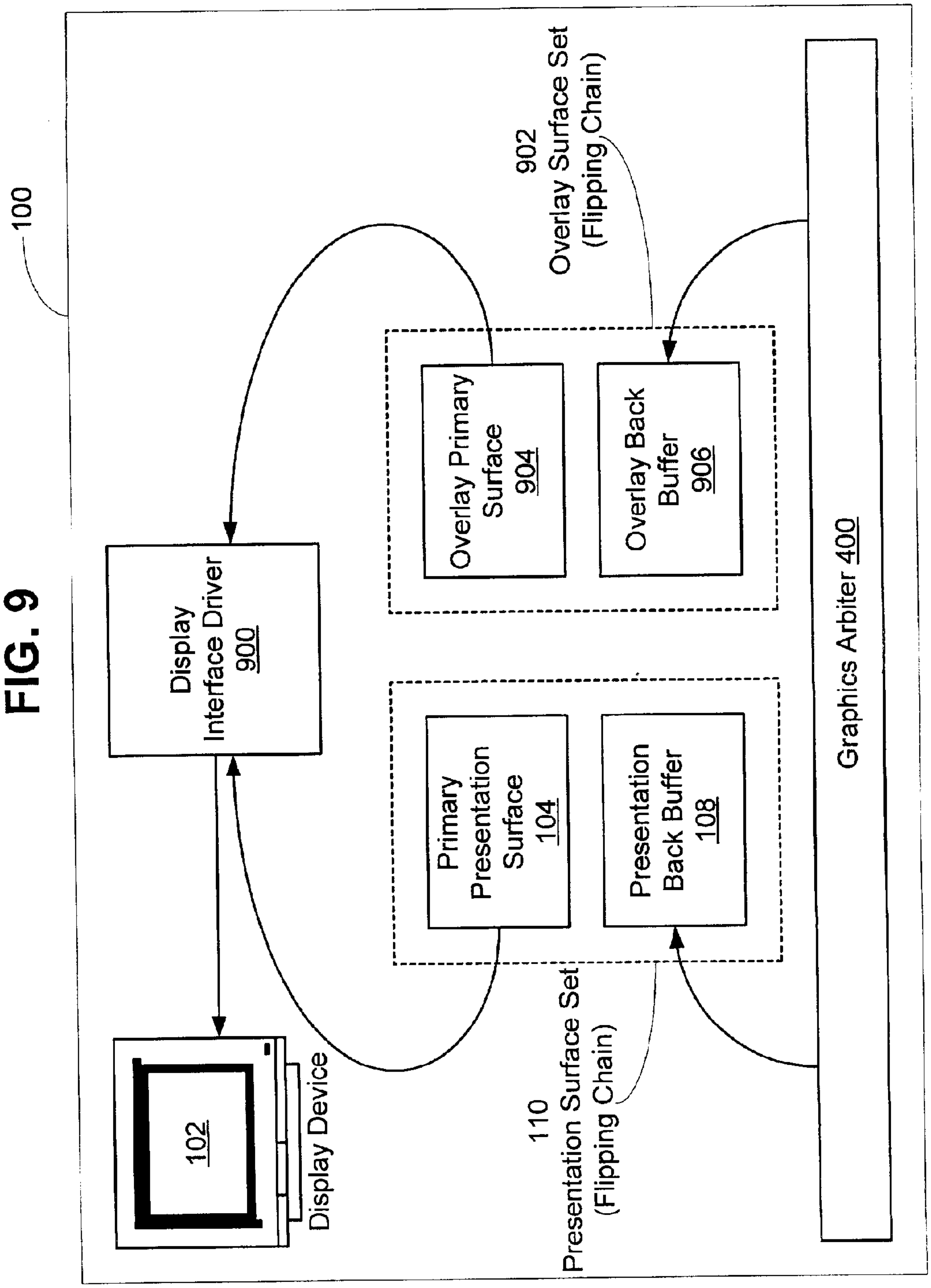
FIG. 9 is a block diagram of an augmented primary surface display system.
Figure 10:
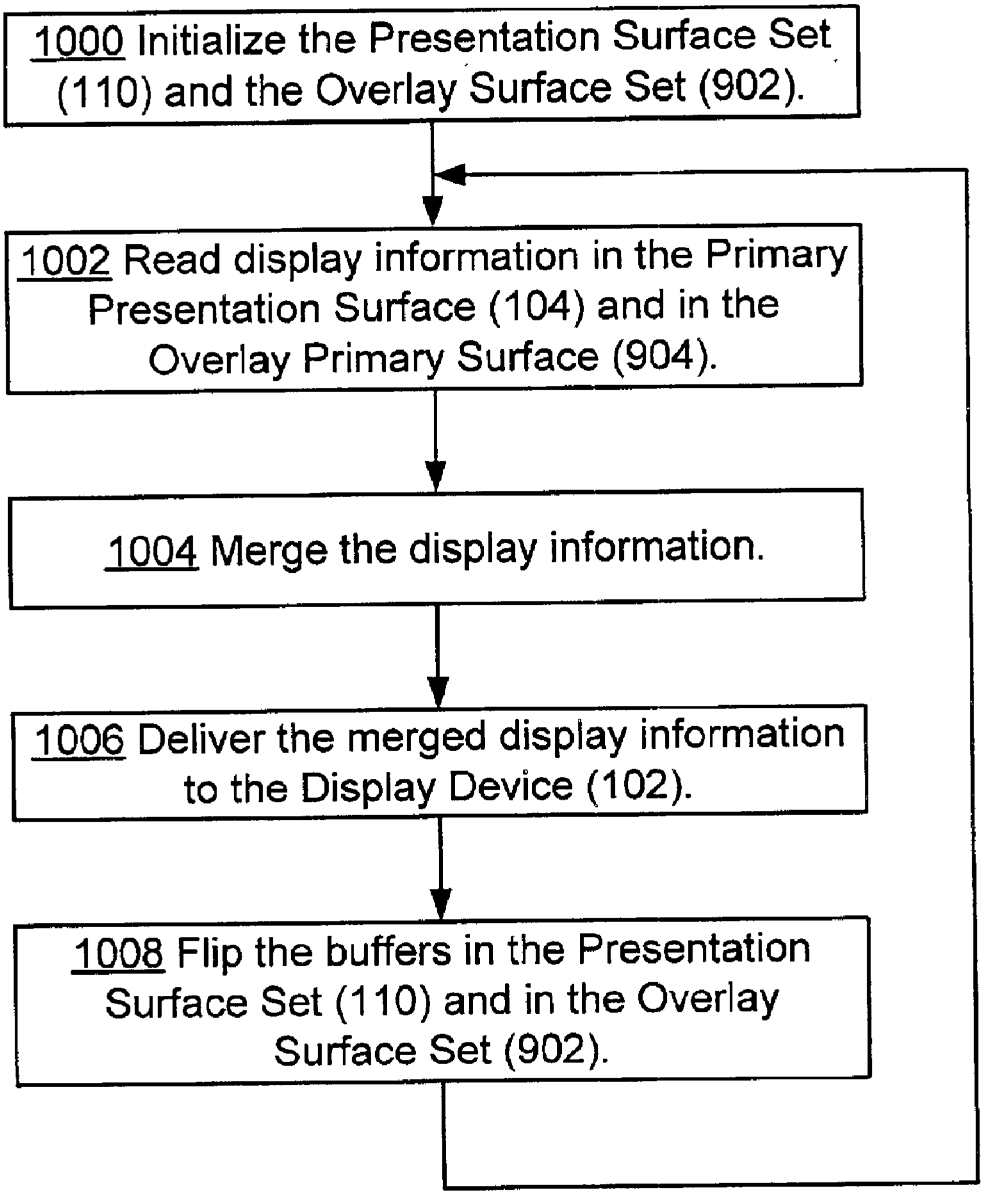
FIG. 10 is a flow chart showing how the augmented primary surface may be used to drive a display device.

Multiple display surfaces may be used simultaneously to drive the display device 102. FIG. 9 shows the configuration and FIG. 10 presents an exemplary method. In step 1000, the display interface driver 900 (usually implemented in hardware) initializes the presentation surface set 110 and an overlay surface set 902. In step 1002, the display interface driver reads display information from both the primary presentation surface 104 and from the overlay primary surface 904. Then in step 1004, the display information from these two sources are merged together. The merged information creates the next display frame which is delivered to the display device in step 1006. The buffers in the presentation surface set and in the overlay surface set are flipped and the loop continues back at step 1002.

The key to this procedure is the merging in step 1004. Many types of merging are possible, depending upon the requirements of the system. As one example, the display interface driver 900 could compare pixels in the primary presentation surface 104 against a color key. For pixels that match the color key, the corresponding pixel is read from the overlay primary surface 904 and sent to the display device 102. Pixels that do not match the color key are sent unchanged to the display device. This is called "destination color-keyed overlay." In another form of merging, an alpha value specifies the opacity of each pixel in the primary presentation surface. For pixels with an alpha of 0, display information from the primary presentation surface is used exclusively. For pixels with an alpha of 255, display information from the overlay primary surface 904 is used exclusively. For pixels with an alpha between 0 and 255, the display information from the two surfaces are interpolated to form the value displayed. A third possible merging associates a Z order with each pixel that defines the precedence of the display information.

FIG. 9 shows graphics arbiter 400 providing information to the presentation back buffer 108 and the overlay back buffer 906. Preferably, the graphics arbiter 400 is as described in Sections III and IV above. However, the augmented primary surface mechanism of FIG. 9 also provides advantages when used with less intelligent graphics arbiters, such as those of the prior art. Working with any type of graphics arbiter, this "back end composition" of the next display frame significantly increases the efficiency of the display process.

VI. An Exemplary Interface to the Graphics Arbiter

Figure 11:
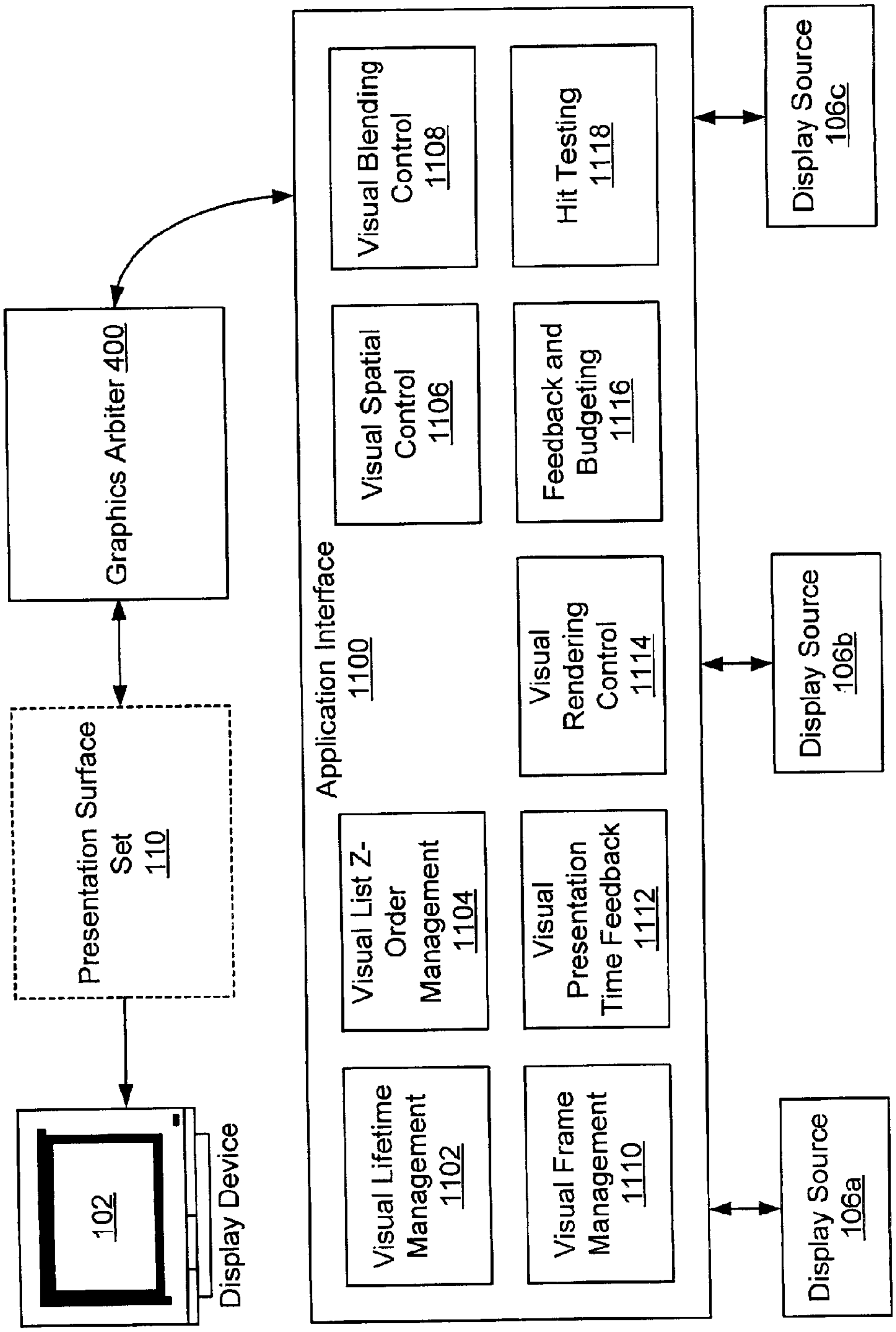
FIG. 11 is a block diagram illustrating categories of functionality provided by an exemplary interface to the graphics arbiter.

FIG. 11 shows display sources 106*a*, 106*b*, and 106*c* using an application interface 1100 to communicate with the graphics arbiter 400. This section presents details of an implementation of the application interface. Note that this section is merely illustrative of one embodiment and is not meant to limit the scope of the claimed invention in any way.

The exemplary application interface 1100 comprises numerous data structures and functions, the details of which are given below. The boxes shown in FIG. 11 within the application interface are categories of supported functionality. Visual Lifetime Management (1102) handles the creation and destruction of graphical display elements (for conciseness' sake, often called simply "visuals") and the management of loss and restoration of visuals. Visual List Z-Order Management (1104) handles the z-order of visuals in lists of visuals. This includes inserting a visual at a specific position in the visual list, removing a visual from the visual list, etc. Visual Spatial Control (1106) handles positioning, scale, and rotation of visuals. Visual Blending Control (1108) handles blending of visuals by specifying the alpha type for a visual (opaque, constant, or per-pixel) and blending modes. Visual Frame Management (1110) is used by a display source to request that a new frame start on a specific visual and to request the completion of the rendering for a specific frame. Visual Presentation Time Feedback (1112) queries the expected and actual presentation time of a visual. Visual Rendering Control (1114) controls rendering to a visual. This includes binding a device to a visual, obtaining the currently bound device, etc. Feedback and Budgeting (1116) reports feedback information to the client. This feedback includes the expected graphics hardware (GPU) and memory impact of editing operations such as adding or deleting visuals from a visual list and global metrics such as the GPU composition load, video memory load, and frame timing. Hit Testing (1118) provides simple hit testing of visuals.

A. Data Type

A.1 HVISUAL

HVISUAL is a handle that refers to a visual. It is passed back by CECreateDeviceVisual, CECreateStaticVisual, and CECreateISVisual and is passed to all functions that refer to visuals, such as CESetInFront.

```
typedef DWORD       HVISUAL, *PHVISUAL;
```

B. Data Structures

B.1CECREATEDEVICEVISUAL

This structure is passed to the CECreateDeviceVisual entry point to surface visual which can be rendered with a Direct3D device.

```
typedef struct      _CECREATEDEVICEVISUAL
{
        /* Specific adapter on which to create this visual. */
        DWORD                                   dwAdapter;
        /* Size of surface to create. */
        DWORD                                   dwWidth, dwHeight;
        /* Number of back buffers. */
        DWORD                                   dwcBackBuffers;
        /* Flags. */
        DWORD                                   dwFlags;
        /*
         * If pixel format flag is set, then pixel format of the back buffers do not use this
        * flag unless they have to, e.g., for a YUV format.
         */
        D3DFORMAT                               dfBackBufferFormat;
        /* If Z-buffer format flag is set, then this is the pixel format of Z-buffer. */
        D3DFORMAT                               dfDepthStencilFormat;
        /* Multi-sample type for surfaces of this visual. */
        D3DMULTISAMPLE_TYPE                     dmtMultiSampleType;
        /*
         * Type of device to create (if any) for this visual. The type of device determines
         * memory placement for the visual.
         */
        D3DDEVTYPE                              ddtDeviceType;
        /* Device creation flags. */
        DWORD                                   dwDeviceFlags;
        /* Visual with which to share the device (rather than create a new visual). */
        HVISUAL                                 hDeviceVisual;
} CECREATEDEVICEVISUAL, *PCECREATEDEVICEVISUAL;
CECREATEDEVICEVISUAL's visual creation flags are as follows.
/*
 * A new Direct3D device should not be created for this visual. This visual will share
 * its device with the visual specified by hDeviceVisual. (hDeviceVisual must hold
 * the non-NULL handle of a valid visual.)
 *
 * If this flag is not specified, then the various fields controlling device creation
 * (ddtDeviceType and dwDeviceFlags) are used to create a device targeting this
 * visual.
 */
#define     CECREATEDEVVIS_SHAREDEVICE                  0x00000001
/*
 * This visual is sharable across processes.
 *
 * If this flag is specified, then the visual exists cross-process and can have its
 * properties modified by multiple processes. Even if this flag is specified, then only a
 * single process can obtain a device to the visual and draw to it. Other processes are
 * permitted to edit properties of the visual and to use the visual's surfaces as textures,
 * but are not permitted to render to those surfaces.
 *
 * All visuals which will be used in desktop composition should specify this flag.
 * Visuals without this flag can only be used in-process.
 */
```

-continued

```
#define    CECREATEDEVVIS_SHARED                      0x00000002
/*
 * A depth stencil buffer should be automatically created and attached to the visual. If
 * this flag is specified, then a depth stencil format must be specified (in
 * dfDepthStencilFormat).
 */
#define    CECREATEDEVVIS_AUTODEPTHSTENCIL            0x00000004
/*
 * An explicit back buffer format has been specified (in dfBackBufferFormat). If no
 * back-buffer format is specified, then a format compatible with the display
 * resolution will be selected.
 */
#define    CECREATEDEVVIS_BACKBUFFERFORMAT            0x00000008
/*
 * The visual may be alpha blended with constant alpha into the display output. This
 * flag does not imply that the visual is always blended with constant alpha, only that
 * it may be at some point in its life. It is an error to set constant alpha on a visual that
 * did not have this flag set when it was created.
 */
#define    CECREATEDEVVIS_ALPHA                       0x00000010
/*
 * The visual may be alpha blended with the per-pixel alpha into the display output.
 * This flag does not imply that the visual is always blended with constant alpha, only
 * that it may be at some point in its life. It is an error to specify this flag and not
 * specify a surface format which includes per-pixel alpha. It is an error to specify per-
 * pixel alpha on a visual that did not have this flag set when it was created.
 */
#define    CECREATEDEVVIS_ALPHAPIXELS                 0x00000020
/*
 * The visual may be bit lock transferred (blt) using a color key into the display
 * output. This flag does not imply that the visual is always color keyed, only that it
 * may be at some point in its life. It is an error to attempt to apply a color key to a
 * visual that did not have this flag set when it was created.
 */
#define    CECREATEDEVVIS_COLORKEY                    0x00000040
/*
 * The visual may have a simple, screen-aligned stretch applied to it at presentation
 * time. This flag does not imply that the visual will always be stretched during
 * composition, only that it may be at some point in its life. It is an error to attempt to
 * stretch a visual that did not have this flag set when it was created.
 */
#define    CECREATEDEVVIS_STRETCH                     0x00000080
/*
 * The visual may have a transform applied to it at presentation time. This flag does
 * not imply that the visual will always have a transform applied to it during
 * composition, only that it may have at some point in its life. It is an error to attempt
 * to apply a transform to a visual that did not have this flag set when it was created.
 */
#define    CECREATEDEVVIS_TRANSFORM                   0x00000100
```

B.2CECREATEDEVICEVISUAL

This structure is passed to the CECreateDeviceVisual entry point to surface visual.

```
typedef struct     _CECREATESTATICVISUAL
{
        /* Specific adapter on which to create this visual.  */
        DWORD                                  dwAdapter;
        /* Size of surfaces to create.  */
        DWORD                                  dwWidth, dwHeight;
        /* Number of surfaces.  */
        DWORD                                  dwcBackBuffers;
        /* Flags.  */
        DWORD                                  dwFlags;
        /*
         * This is the pixel format of surfaces (only valid if the pixel format flag is set).
         * Only specify an explicit pixel format if it is necessary to do so. If no format is
         * specified, then a format compatible with the display is chosen automatically.
         */
```

-continued

```
        D3DFORMAT                                  dfBackBufferFormat;
        /*
         * An array of pointers to the pixel data to initialize the surfaces of the visual. The
         * length of this array must be the same as the value of dwcBackBuffers. Each
         * element of the array is a pointer to a block of memory holding pixel data for
         * that surface. Each row of pixel data must be DWORD aligned. If the surface
         * format is RGB, then the data should be in 32-bit, integer XRGB format (or
         * ARGB format if the format has alpha). If the surface format is YUV, then the
         * pixel data should be in the same YUV format.
         */
        LPVOID *                                   ppvPixelData;
} CECREATESTATICVISUAL, *PCECREATESTATICVISUAL;
CECREATESTATICVISUAL's visual creation flags are as follows.
/*
 * This visual is sharable across processes.
 *
 * If this flag is specified, then the visual exists cross-process and can have its
 * properties modified by multiple processes. All visuals which will be used in
 * desktop composition should specify this flag. Visuals without this flag can only be
 * used in-process.
 */
#define     CECREATESTATVIS_SHARED                 0x00000001
/*
 * An explicit back buffer format has been specified (in dfBackBufferFormat). If no
 * back-buffer format is specified, then a format compatible with the display
 * resolution will be selected.
 */
#define     CECREATESTATVIS_BACKBUFFERFORMAT       0x00000002
/*
 * The visual may be alpha blended with constant alpha into the display output. This
 * flag does not imply that the visual is always blended with constant alpha, only that
 * it may be at some point in its life. It is an error to set constant alpha on a visual that
 * did not have this flag set when it was created.
 */
#define     CECREATESTATVIS_ALPHA                  0x00000004
/*
 * The visual may be alpha blended with the per-pixel alpha into the display output.
 * This flag does not imply that the visual is always blended with constant alpha, only
 * that it may be at some point in its life. It is an error to specify this flag and not
 * specify a surface format which includes per-pixel alpha. It is an error to specify per-
 * pixel alpha on a visual that did not have this flag set when it was created.
 */
#define     CECREATESTATVIS_ALPHAPIXELS            0x00000008
/*
 * The visual may be blt using a color key into the display output. This flag does not
 * imply the visual is always color keyed, only that it may be at some point in its life.
 * It is an error to attempt to apply a color key to a visual that did not have this flag set
 * when it was created.
 */
#define     CECREATESTATVIS_COLORKEY               0x00000010
/*
 * The visual may have a simple, screen-aligned stretch applied to it at presentation
 * time. This flag does not imply that the visual will always be stretched during
 * composition, only that it may be at some point in its life. It is an error to attempt to
 * stretch a visual that did not have this flag set when it was created.
 */
#define     CECREATESTATVIS_STRETCH                0x00000020
/*
 * The visual may have a transform applied to it at presentation time. This does not
 * imply that the visual will always have a transform applied to it during composition,
 * only that it may have at some point in its life. It is an error to attempt to apply a
 * transform to a visual that did not have this flag set when it was created.
 */
#define     CECREATESTATVIS_TRANSFORM              0x00000040
```

B.3CECREATEDEVICEVISUAL

This structure is passed to the CECreateDeviceVisual entry point to surface a surface visual.

B.3 CECREATEISVISUAL

This structure is passed to the CECreateISVisual entry point to create a surface visual.

```
typedef struct      _CECREATEISVISUAL
```

-continued

```
{
        /* Specific adapter on which to create this visual.  */
        DWORD                                   dwAdapter;
        /* Length of the instruction buffer.  */
        DWORD                                   dwLength;
        /* Flags.  */
        DWORD                                   dwFlags;
} CECREATEISVISUAL,  *PCECREATEISVISUAL;
CECREATEISVISUAL's visual creation flags are as follows.
/*
 * This visual is sharable across processes.
 *
 * If this flag is specified, then the visual exists cross-process and can have its
 * properties modified by multiple processes. All visuals which will be used in
 * desktop composition should specify this flag. Visuals without this flag can only be
 * used in-process.
 */
#define      CECREATEISVIS_SHARED                       0x00000001
/*
 * Grow the visual's instruction buffer if it exceeds the specified size.
 *
 * By default, an error occurs if the addition of an instruction to an IS Visual would
 * cause the buffer to overflow. If this flag is specified, then the buffer is grown to
 * accommodate the new instruction. For efficiency's sake, the buffer, in fact, is
 * grown more than is required for the new instruction.
 */
#define      CECREATEISVIS_GROW                         0x00000002
```

B.4Alpha Information

This structure specifies the constant alpha value to use when incorporating a visual into the desktop, as well as whether to modulate the visual alpha with the per-pixel alpha in the source image of the visual.

```
/* This structure is valid only for objects that contain alpha.  */
typedef struct      _CE_ALPHAINFO
{
        /* 0.0 is transparent; 1.0 is opaque.
        float                                   fConstantAlpha;
        /* Modulate constant alpha with per-pixel alpha?
        bool                                    bModulate;
} CE_ALPHAINFO,  *PCE_ALPHAINFO;
```

C. Function Calls

C.1 Visual Lifetime Management (1102 in FIG. 11)

There are several entry points to create different types of visuals: device visuals, static visuals, and Instruction Stream Visuals.

C.1 CECreateDeviceVisual

CECreateDeviceVisual creates a visual with one or more surfaces and a Direct3D device for rendering into those surfaces. In most cases, this call results in a new Direct3D device being created and associated with this visual. However, it is possible to specify another device visual in which case the newly created visual will share the specified visual's device. As devices cannot be shared across processes, the device to be shared must be owned by the same process as the new visual.

A number of creation flags are used to describe what operations may be required for this visual, e.g., whether the visual will ever be stretched or have a transform applied to it or whether the visual will ever be blended with constant alpha. These flags are not used to force a particular composition operation (bit vs. texturing) as the graphics arbiter 400 selects the appropriate mechanism based on a number of factors. These flags are used to provide feedback to the caller over operations that may not be permitted on a specific surface type. For example, a particular adapter may not be able to stretch certain formats. An error is returned if any of the operations specified are not supported for that surface type. CECreateDeviceVisual does not guarantee that the actual surface memory or device will be created by the time this call returns. The graphics arbiter may choose to create the surface memory and device at some later time.

```
HRESULT CECreateDeviceVisual
(
    PHVISUAL                        phVisual,
    PCECREATEDEVICEVISUAL           pDeviceCreate
);
```

C.1.b CECreateStaticVisual

CECreateStaticVisual creates a visual with one or more surfaces whose contents are static and are specified at creation time.

```
HRESULT CECreateStaticVisual
(
    PHVISUAL                        phVisual,
    PCECREATESTATICVISUAL           pStaticCreate
);
```

C.1.c CECreateISVisual

CECreateISVisual creates an Instruction Stream Visual. The creation call specifies the size of buffer desired to hold drawing instructions.

```
HRESULT CECreateISVisual
(
    PHVISUAL                  phVisual,
    PCECREATEISVISUAL         pISCreate
);
```

C.1.d CECreateRefVisual

CECreateRefVisual creates a new visual that references an existing visual and shares the underlying surfaces or Instruction Stream of that visual. The new visual maintains its own set of visual properties (rectangles, transform, alpha, etc.) and has its own z-order in the composition list, but shares underlying image data or drawing instructions.

```
HRESULT CECreateRefVisual
(
    DWORD       dwFlags,
    HVISUAL     hVisual
);
```

C.1.e CEDestroyVisual

CEDestroyVisual destroys a visual and releases the resources associated with the visual.

```
HRESULT CEDestroyVisual(HVISUAL    hVisual);
```

C.2 Visual List Z-Order Management (1104 in FIG. 11)

CESetVisualOrder sets the z-order of a visual. This call can perform several related functions including adding or removing a visual from a composition list and moving a visual in the z-order absolutely or relative to another visual.

```
HRESULT CESetVisualOrder
(
    HCOMPLIST   hCompList,
    HVISUAL     hVisual,
    HVISUAL     hRefVisual,
    DWORD       dwFlags
);
```

Flags specified with the call determine which actions to take. The flags are as follows:

CESVO_ADDVISUAL adds the visual to the specified composition list. The visual is removed from its existing list (if any). The z-order of the inserted element is determined by other parameters to the call.

CESVO_REMOVEVISUAL removes a visual from its composition list (if any). No composition list should be specified. If this flag is specified, then parameters other than hVisual and other flags are ignored.

CESVO_BRINGTOFRONT moves the visual to the front of its composition list. The visual must already be a member of a composition list or must be added to a composition list by this call.

CESVO_SENDTOBACK moves the visual to the back of its composition list. The visual must already be a member of a composition list or must be added to a composition list by this call.

ESVO_INFRONT moves the visual in front of the visual hRefVisual. The two visuals must be members of the same composition list (or hVisual must be added to hRefVisual's composition list by this call).

ESVO_BEHIND moves the visual behind the visual hRefVisual. The two visuals must be members of the same composition list (or hVisual must be added to hRefVisual's composition list by this call).

C.3 Visual Spatial Control (1106 in FIG. 11)

A visual can be placed in the output composition space in one of two ways: by a simple screen-aligned rectangle copy (possibly involving a stretch) or by a more complex transform defined by a transformation matrix. A given visual uses only one of these mechanisms at any one time although it can switch between rectangle-based positioning and transform-based positioning.

Which of the two modes of visual positioning is used is decided by the most recently set parameter, e.g., if CESetTransform was called more recently then any of the rectangle-based calls, then the transform is used for positioning the visual. On the other hand, if a rectangle call was used more recently, then the transform is used.

No attempt is made to keep the rectangular positions and the transform in synchronization. They are independent properties. Hence, updating the transform will not result in a different destination rectangle.

C.3.a CESet and Get SrcRect

Set and get the source rectangle of a visual, i.e., the sub-rectangle of the entire visual that is displayed. By default, the source rectangle is the full size of the visual. The source rectangle is ignored for IS Visuals. Modifying the source applies both to rectangle positioning mode and to transform mode.

```
HRESULT CESetSrcRect
(
    HVISUAL     hVisual,
    int         left, top, right, bottom
);
HRESULT CEGetSrcRect
(
    HVISUAL     hVisual,
    PRECT       prSrc
);
```

C.3.b CESet and GetUL

Set and get the upper left comer of a rectangle. If a transform is currently applied, then setting the upper left comer switches from transform mode to rectangle-positioning mode.

```
HRESULT CESetUL
(
    HVISUAL     hVisual,
    int         x, y
);
HRESULT CEGetUL
(
    HVISUAL     hVisual,
    PPOINT      pUL
);
```

C.3.c CESet and GetDestRect

Set and get the destination rectangle of a visual. If a transform is currently applied, then setting the destination rectangle switches from transform mode to rectangle mode. The destination rectangle defines the viewport for IS Visuals.

```
HRESULT CESetDestRect
(
    HVISUAL     hVisual,
    int         left, top, right, bottom
);
HRESULT CEGetDestRect
(
    HVISUAL     hVisual,
    PRECT       prDest
);
```

C.3.d CESet and GetTransform

Set and get the current transform. Setting a transform overrides the specified destination rectangle (if any). If a NULL transform is specified, then the visual reverts to the destination rectangle for positioning the visual in composition space.

```
HRESULTCESetTransform
(
    HVISUAL          hVisual,
    D3DMATRIX*       pTransform
);
HRESULT CEGetTransform
(
    HVISUAL          hVisual,
    D3DMATRIX*       pTransform
);
```

C.3.e CESet and GetClipRect

Set and get the screen-aligned clipping rectangle for this visual.

```
HRESULT CESetClipRect
(
    HVISUA3L     hVisual,
    int          left, top, right, bottom
);
HRESULT CEGetClipRect
(
    HVISUAL      hVisual,
    PRECT        prClip
);
```

C.4 Visual Blending Control (1108 in FIG. 11)

C.4.a CESetColorKey

```
HRESULT CESetColorKey
(
    HVISUAL      hVisual,
    DWORD        dwColor
);
```

C4.h CESet and CTetAlphaInfo

Set and get the constant alpha and modulation.

```
HRESULT CESetAlphaInfo
(
    HVISUAL            hVisual,
    PCE_ALPHAINFO      pInfo
);
HRESULT CEGetAlphaInfo
(
    HVISUAL            hVisual,
    PCE_ALPHAINFO      pInfo
);
```

C.5 Visual Presentation Time Feedback (1112 in FIG. 11)

Several application scenarios are accommodated by this infrastructure.

Single-buffered applications just want to update a surface and have those updates reflected in desktop compositions. These applications do not mind tearing.

Double-buffered applications want to make updates available at arbitrary times and have those updates incorporated as soon as possible after the update.

Animation applications want to update periodically, preferably at display refresh, and are aware of timing and occlusion.

Video applications want to submit fields or frames for incorporation with timing information tagged.

Some clients want to be able to get a list of exposed rectangles so they can take steps to draw only the portions of the back buffer that will contribute to the desktop composition. (Possible strategies here include managing the Direct3D clipping planes and initializing the Z buffer in the occluded regions with a value guaranteed never to pass the Z test.)

C.5.a CEOpenFrame

Create a frame and pass back information about the frame.

```
HRESULT CEOpenFrame
(
    PCEFRAMEINFO       pInfo,
    HVISUAL            hVisual,
    DWORD              dwFlags
);
```

The flags and their meanings are:

CEFRAME_UPDATE indicates that no timing information is needed. The application will call CECloseFrame when it is done updating the visual.

CEFRAME_VISIBLEINFO means the application wishes to receive a region with the rectangles that correspond to visible pixels in the output.

CEFRAME_NOWAIT asks to return an error if a frame cannot be opened immediately on this visual. If this flag is not set, then the call is synchronous and will not return until a frame is available.

C.5.b CECloseFrame

Submit the changes in the given visual that was initiated with a CEOpenFrame call. No new frame is opened until CEOpenFrame is called again.

```
HRESULT CECloseFrame(HVISUAL      hVisual);
```

C.5.c CENextFrame

Atomically submit the frame for the given visual and create a new frame. This is semantically identical to closing the frame on hVisual and opening a new frame. The flags word parameter is identical to that of CEOpenFrame. If CEFRAME_NOWAIT is set, the visual's pending frame is submitted, and the function returns an error if a new frame cannot be acquired immediately. Otherwise, the function is synchronous and will not return until a new frame is available. If NOWAIT is specified and an error is returned, then the application must call CEOpenFrame to start a new frame.

```
HRESULT CENextFrame
(
    PCEFRAMEINFO       pInfo,
    HVISUAL            hVisual,
    DWORD              dwFlags
);
```

C.5.d CEFRAMEINFO

```
typedef struct__CEFRAMEINFO
{
    // Display refresh rate in Hz.
    int                                  iRefreshRate;
    // Frame number to present for.
    int                                  iFrameNo;
    // Frame time corresponding to frame number.
    LARGE__INTEGER                       FrameTime;
    // DirectDraw surface to render to.
    LPDIRECTDRAWSURFACE7                 pDDS;
    // Region in the output surface that corresponds to visible pixels.
    HRGN                                 hrgnVisible;
} CEFRAMEINFO, *PCEFRAMEINFO;
```

C.6 Visual Rendering Control (1114 in FIG. 11)

CEGetDirect3DDevice retrieves a Direct3D device used to render to this visual. This function only applies to device visuals and fails when called on any other visual type. If the device is shared between multiple visuals, then this function sets the specified visual as the current target of the device. Actual rendering to the device is only possible between calls to CEOpenFrame or CENextFrame and CECloseFrame, although state setting may occur outside this context.

This function increments the reference count of the device.

```
HRESULT CEGetDirect3DDevice
(
    HVISUAL      hVisual,
    LPVOID*      ppDevice,
    REFIID       iid
);
```

C.7 Hit Testing (1118 in FIG. 11)

C.7.a CESetVisible

Manipulate the visibility count of a visual. Increments (if bVisible is TRUE) or decrements (if bVisible is FALSE) the visibility count. If this count is 0 or below, then the visual is not incorporated into the desktop output. If pCount is non-NULL, then it is used to pass back the new visibility count.

```
HRESULT CESetVisible
(
    HVISUAL      hVisual,
    BOOL         bVisible,
    LPLONG       pCount
);
```

C.7.b CEHitDetect

Take a point in screen space and pass back the handle of the topmost visual corresponding to that point. Visuals with hit-visible counts of 0 or lower are not considered. If no visual is below the given point, then a NULL handle is passed back.

```
HRESULT CEHitDetect
(
    PHVISUAL     pOut,
    LPPOINT      ppntWhere
);
```

C.7.c CEHitVisible

Increment or decrement the hit-visible count. If this count is 0 or lower, then the visual is not considered by the hit testing algorithm. If non-NULL, the LONG pointed to by pCount will pass back the new hit-visible count of the visual after the increment or decrement.

```
HRESULT CEHitVisible
(
    HVISUAL      pOut,
    BOOL         bVisible,
    LPLONG       pCount
);
```

C.8 Instruction Stream Visual Instructions

These drawing functions are available to Instruction Stream Visuals. They do not perform immediate mode rendering but rather add drawing commands to the IS Visual's command buffer. The hVisual passed to these functions refers to an IS Visual. A new frame for the IS Visual must have been opened by means of CEOpenFrame before attempting to invoke these functions.

Add an instruction to the visual to set the given render state.

```
HRESULT CEISVisSetRenderState
(
    HVISUAL                          hVisual,
    CEISVISRENDERSTATETYPE           dwRenderState,
    DWORD                            dwValue
);
```

Add an instruction to the visual to set the given transformation matrix.

```
HRESULT CEISVisSetTransform
(
    HVISUAL                          hVisual,
    CEISVISTRANSFORMTYPE             dwTransformType,
    LPD3DMATRIX                      lpMatrix
);
```

Add an instruction to the visual to set the texture for the given stage.

```
HRESULT CEISVisSetTexture
(
    HVISUAL                          hVisual,
    DWORD                            dwStage,
    IDirect3DBaseTexture9*           pTexture
);
```

Add an instruction to the visual to set the properties of the given light.

```
HRESULT CEISVisSetLight
(
    HVISUAL                          hVisual,
    DWORD                            index,
    const D3DLIGHT9*                 pLight
);
```

Add an instruction to the visual to enable or disable the given light.

```
HRESULT CEISVisLightEnable
(
    HVISUAL          hVisual,
    DWORD            index,
    BOOL             bEnable
);
```

Add an instruction to the visual to set the current material properties.

```
HRESULT CEISVisSetMaterial
(
    HVISUAL                 hVisual,
    const D3DMATRIAL9*      pMaterial
);
```

In view of the many possible embodiments to which the principles of this invention may be applied, it should be recognized that the embodiments described herein with respect to the drawing figures are meant to be illustrative only and should not be taken as limiting the scope of the invention. For example, the graphics arbiter may simultaneously support multiple display devices, providing timing and occlusion information for each of the devices. Therefore, the invention as described herein contemplates all such embodiments as may come within the scope of the following claims and equivalents thereof.

We claim:

1. A system for displaying information from a first display source and from a second display source on a display device, the system comprising:

a presentation surface set associated with the display device, wherein the presentation surface set comprises a presentation flipping chain, the presentation flipping chain comprising a primary presentation surface and a presentation back buffer;

a first display memory surface set associated with the first display source;

a second display memory surface set associated with the second display source;

a graphics arbiter, distinct from the first display source and from the second display source, for transferring display information from the first display memory surface set and from the second display memory surface set to the presentation surface set, wherein the graphics arbiter transfers display information to the presentation back buffer; and a comparator for comparing contents of the presentation back buffer with contents of a buffer immediately preceding the presentation back buffer in the presentation flipping chain and, if the contents match, for inhibiting a flip in the presentation flipping chain.

2. A system for displaying information from a first display source and from a second display source on a display device, the system comprising:

a presentation surface set associated with the display device;

a first display memory surface set associated with the first display source;

a second display memory surface set associated with the second display source; and a graphics arbiter, distinct from the first display source and from the second display source, for transferring display information from the first display memory surface set and from the second display memory surface set to the presentation surface set, wherein the graphics arbiter notifies the first display source of a first estimated time when a future frame will be displayed on the display device.

3. The system of claim 2 wherein the graphics arbiter notifies the first display source in association with receiving an indication of a refresh of the display device.

4. The system of claim 2 wherein the first display source deinterlaces video to prepare display information in the first display memory surface set, the deinterlacing based, at least in part, on the first estimated frame display time.

5. The system of claim 2 wherein the first display source interpolates video to prepare display information in the first display memory surface set, the interpolating based, at least in part, on the first estimated frame display time.

6. A system for displaying information from a first display source and from a second display source on a display device, the system comprising:

a presentation surface set associated with the display device;

a first display memory surface set associated with the first display source;

a second display memory surface set associated with the second display source; and a graphics arbiter, distinct from the first display source and from the second display source, for transferring display information from the first display memory surface set and from the second display memory surface set to the presentation surface set, wherein the graphics arbiter provides occlusion information to the first display source.

7. A method for a graphics arbiter, distinct from a first display source and from a second display source, to display information from the first display source and from the second display source on a display device, the method comprising:

gathering display information from a first display memory surface set associated with the first display source;

gathering display information from a second display memory surface set associated with the second display source;

transferring display information from the first display memory surface set and from the second display memory surface set to a presentation surface set associated with the display device, wherein transferring display information comprises transferring display information to a presentation back buffer of a presentation flipping chain of the presentation surface set; and comparing contents of the presentation back buffer with contents of a buffer immediately preceding the presentation back buffer in the presentation flipping chain and, if the contents match, inhibiting a flip in the presentation flipping chain.

8. A method for a graphics arbiter, distinct from a first display source and from a second display source, to display information from the first display source and from the second display source on a display device, the method comprising:

gathering display information from a first display memory surface set associated with the first display source;

gathering display information from a second display memory surface set associated with the second display source;

transferring display information from the first display memory surface set and from the second display memory surface set to a presentation surface set associated with the display device; and notifying the first display source of an estimated time when a future frame will be displayed on the display device.

9. The method of claim 8 wherein the notifying of the first display source is associated with receiving an indication of a refresh of the display device.

10. The method of claim 8 wherein the first display source deinterlaces video to prepare display information in the first display memory surface set, the deinterlacing based, at least in part, on the estimated frame display time.

11. The method of claim 8 wherein the first display source interpolates video to prepare display information in the first display memory surface set, the interpolating based, at least in part, on the estimated frame display time.

12. A method for a graphics arbiter, distinct from a first display source and from a second display source, to display information from the first display source and from the second display source on a display device, the method comprising:

gathering display information from a first display memory surface set associated with the first display source;

gathering display information from a second display memory surface set associated with the second display source;

transferring display information from the first display memory surface set and from the second display memory surface set to a presentation surface set associated with the display device; and providing occlusion information to the first display source.

* * * * *

UNITED STATES PATENT AND TRADEMARK OFFICE

CERTIFICATE OF CORRECTION

PATENT NO. : 7,038,690 B2
APPLICATION NO. : 10/074286
DATED : May 2, 2006
INVENTOR(S) : Nicholas P. Wilt et al.

It is certified that error appears in the above-identified patent and that said Letters Patent is hereby corrected as shown below:

In column 1, line 56, after "operating" delete ",".

In column 6, line 10, after "and" delete ",".

In column 13, line(s) 6–7, delete "A. Format Translation" and insert -- A. Format Translation --, therefor on line 7 as a sub heading.

In column 18, line 16, after "to" insert -- create a --.

In column 19, line 45, delete "B.2CECREATEDEVICEVISUAL" and insert -- B.2CECREATESTATICVISUAL --, therefor.

In column 19, line 46, delete "CECreateDeviceVisual" and insert -- CECreateStaticVisual --, therefor.

In column 19, line 47, after "to" insert -- create a --.

In column 21 (Excluding Tables), line 1, delete "B.3CECREATEDEVICEVISUAL" and insert -- B.3CECREATEISVISUAL --, therefor.

In column 21 (Excluding Tables), line 2, delete "CECreateDeviceVisual" and insert -- CECreateISVisual --, therefor.

In column 21 (Excluding Tables), line 3, after "to" delete "surface" and insert -- create --, therefor.

In column 21, last four unnumbered lines, after the text between the tables, delete "B.3CECREATEDEVICEVISUAL This structure is passed to the CECreateISVisual entry point to create a surface visual. typedef struct _CECREATEISVISUAL" (repeated text).

In column 23 (Table 1), line 27, delete "CECREATEISVIS GROW" and insert -- CECREATEISVIS_GROW --, therefor.

In column 23, line 48, delete "C.1" and insert -- C.1.a --, therefor.

In column 26, line 31, delete "comer" and insert -- corner --, therefor.

In column 26, line 33, delete "comer" and insert -- corner --, therefor.

In column 27, line 23, delete "HVISUA3L" and insert -- HVISUAL --, therefor.

In column 27, line 42, delete "C4.h" and insert -- C.4.b --, therefor.

In column 27, line 42, delete "CTetAlphaInfo" and insert -- GetAlphaInfo --, therefor.

Signed and Sealed this

Twenty-third Day of March, 2010

David J. Kappos
*Director of the United States Patent and Trademark Office*